US012736863B2

(12) United States Patent
Yan et al.

(10) Patent No.: US 12,736,863 B2
(45) Date of Patent: Sep. 15, 2026

(54) LIGHT SOURCE AND LASER PROJECTION APPARATUS

(71) Applicant: Hisense Laser Display Co., Ltd., Shandong (CN)

(72) Inventors: Ke Yan, Shandong (CN); Youliang Tian, Shandong (CN); Wei Li, Shandong (CN); Xianrong Liu, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 349 days.

(21) Appl. No.: 18/471,557

(22) Filed: Sep. 21, 2023

(65) Prior Publication Data

US 2024/0012318 A1 Jan. 11, 2024

Related U.S. Application Data

(63) Continuation of application No. PCT/CN2022/103189, filed on Jun. 30, 2022.

(30) Foreign Application Priority Data

Sep. 6, 2021 (CN) ......................... 202111037636.X
Sep. 6, 2021 (CN) ......................... 202111038612.6
(Continued)

(51) Int. Cl.
*G03B 21/20* (2006.01)
*G02B 27/48* (2006.01)
*G03B 21/00* (2006.01)

(52) U.S. Cl.
CPC ......... *G03B 21/2033* (2013.01); *G02B 27/48* (2013.01); *G03B 21/005* (2013.01);
(Continued)

(58) Field of Classification Search
CPC .................. G03B 21/00–64; H04N 9/31–3197
See application file for complete search history.

(56) References Cited

U.S. PATENT DOCUMENTS 6,332,684 B1 12/2001 Shibatani et al.
2003/0063262 A1 4/2003 Kim et al.
(Continued)

FOREIGN PATENT DOCUMENTS

CN 1410784 A 4/2003
CN 201464788 A 5/2010
(Continued)

OTHER PUBLICATIONS

International search report of PCT application No. PCT/CN2022/103189 issued on Sep. 23, 2022.
(Continued)

*Primary Examiner* — Christopher A Lamb, II
(74) *Attorney, Agent, or Firm* — Knobbe, Martens, Olson & Bear, LLP

(57) ABSTRACT

Provided is a light source, comprising at least one laser array, a light combining assembly, and a fly-eye lens; wherein the at least one laser array is configured to emit at least two colors of laser light; the light combining assembly is disposed on a light-output side of the at least one laser array and is configured to guide the laser light emitted from the at least one laser array to the fly-eye lens; the fly-eye lens is disposed on a light-output side of the light combining assembly and is configured to homogenize the laser light emitted from the at least one laser array; wherein the fly-eye lens comprises: a substrate; a plurality of first microlenses disposed on a light-incident surface of the substrate; and a plurality of second microlenses disposed on a light-output surface of the substrate.

19 Claims, 18 Drawing Sheets

(30) Foreign Application Priority Data

Sep. 23, 2021 (CN) .......................... 202111117186.5
Sep. 27, 2021 (CN) .......................... 202111136696.7

(52) U.S. Cl.
CPC ..... *G03B 21/2013* (2013.01); *G03B 21/2066* (2013.01); *G03B 21/2073* (2013.01); *G03B 21/208* (2013.01)

(56) References Cited

U.S. PATENT DOCUMENTS

2010/0053565 A1* 3/2010 Mizushima ........ G03B 21/2033 353/38
2011/0187998 A1* 8/2011 Kimura .................. G03B 21/14 353/20
2016/0198135 A1* 7/2016 Kita .......................... F21V 9/08 348/756
2020/0301156 A1 9/2020 Nagahara
2021/0084266 A1* 3/2021 Hu ....................... G03B 21/142
2021/0195147 A1 6/2021 Yamagata

FOREIGN PATENT DOCUMENTS

CN 107861178 A 3/2018
CN 109975985 A 7/2019
CN 111766756 A 10/2020
CN 211698453 U 10/2020
CN 112114480 A 12/2020
CN 112987471 A 6/2021
CN 112987472 A 6/2021
CN 113777868 A 12/2021
CN 113867088 A 12/2021
CN 113960868 A 1/2022
CN 216595871 U 5/2022

OTHER PUBLICATIONS

International search report of PCT application No. PCT/CN2022/113144 issued on Nov. 17, 2022.

* cited by examiner

Red laser light
Blue laser light
Green laser light

Red laser light
Blue laser light
Green laser light
Fast axis
Slow axis
104
1046
1045

LIGHT SOURCE AND LASER PROJECTION APPARATUS

CROSS-REFERENCE TO RELATED APPLICATION

This application is a continuation application of international application No. PCT/CN2022/103189, filed on Jun. 30, 2022, which claims priority to Chinese Patent Application No. 202111117186.5 filed on Sep. 23, 2021, Chinese Patent Application No. 202111038612.6 filed on Sep. 6, 2021, Chinese Patent Application No. 202111037636.X filed on Sep. 6, 2021, and Chinese Patent Application No. 202111136696.7 filed on Sep. 27, 2021, the entire contents of which are incorporated herein by reference.

TECHNICAL FIELD

The present disclosure relates to the field of projection technologies, and in particular, relates to a light source and a laser projection apparatus.

BACKGROUND

With the development of photoelectric technology, the requirement on projection pictures of a laser projection apparatus is becoming higher and higher. In order to ensure the display brightness of the projection pictures, a laser is usually used to illuminate the laser projection apparatus. Laser beams emitted from the laser have the characteristics of good monochromaticity and high brightness, and the laser is an ideal light source.

SUMMARY

In one aspect, some embodiments of the present disclosure provide a light source. The light source includes at least one laser array, a light combining assembly, and a fly-eye lens. The at least one laser array is configured to emit at least two colors of laser light. The light combining assembly is disposed on a light-output side of the at least one laser array and is configured to guide the laser light emitted from the at least one laser array to the fly-eye lens. The fly-eye lens is disposed on a light-output side of the light combining assembly and is configured to homogenize the laser light emitted from the at least one laser array. The fly-eye lens includes a substrate, a plurality of first microlenses, and a plurality of second microlenses. The plurality of first microlenses are disposed on an incident surface of the substrate, and the plurality of second microlenses are disposed on a light-output surface of the substrate and correspond to the plurality of second microlenses.

In another aspect, some embodiments of the present disclosure provide a laser projection apparatus. The laser projection apparatus includes the light source as described above, an optical machine and a lens head. The light source is configured to emit an illumination beam to the optical machine. The optical machine includes a light valve configured to modulate the illumination beam emitted from the light source to obtain a projection beam. The lens head is configured to image the projection beam.

DETAILED DESCRIPTION

Hereinafter, the technical solutions in some embodiments of the present disclosure will be described clearly and completely with reference to the accompanying drawings. Apparently, the described embodiments are merely some embodiments of the present disclosure, rather than all embodiments. All other embodiments derived by those skilled in the art based on the embodiments of the present disclosure shall fall within the protection scope of the present disclosure.

Unless the context requires otherwise, the term "comprise" and its other forms such as the third person singular form "comprises" and the present participle form "comprising" are to be construed as open-ended and inclusive, i.e., "including, but not limited to," throughout the specification and claims.

Hereinafter, the terms "first" and "second" are used for descriptive purposes only and should not be construed as indicating or implying relative importance or implicitly indicating the number of technical features indicated. Thus, a feature defined by "first" or "second" explicitly or implicitly includes one or more of the features. In the description of the embodiments of the present disclosure, "a plurality of" means two or more, unless otherwise specified.

In the description of some embodiments, "coupled" and "connected" and their derivatives are used. For example, the term "connected" is used in the description of some embodiments to indicate that two or more components are in direct physical or electrical contact with each other.

The use of "applicable to" or "configured to" herein is meant to be open-ended and inclusive, without excluding devices applicable to or configured to perform additional tasks or steps.

As used herein, the value defined by "about" and "approximately" includes the stated value and an average value within an acceptable deviation range of a particular value. The acceptable deviation range is, for example, determined by one of ordinary skill in the art in consideration of the measurement being discussed and the error associated with a particular amount of measurement (i.e., the limitations of the measurement system).

Figure 1:
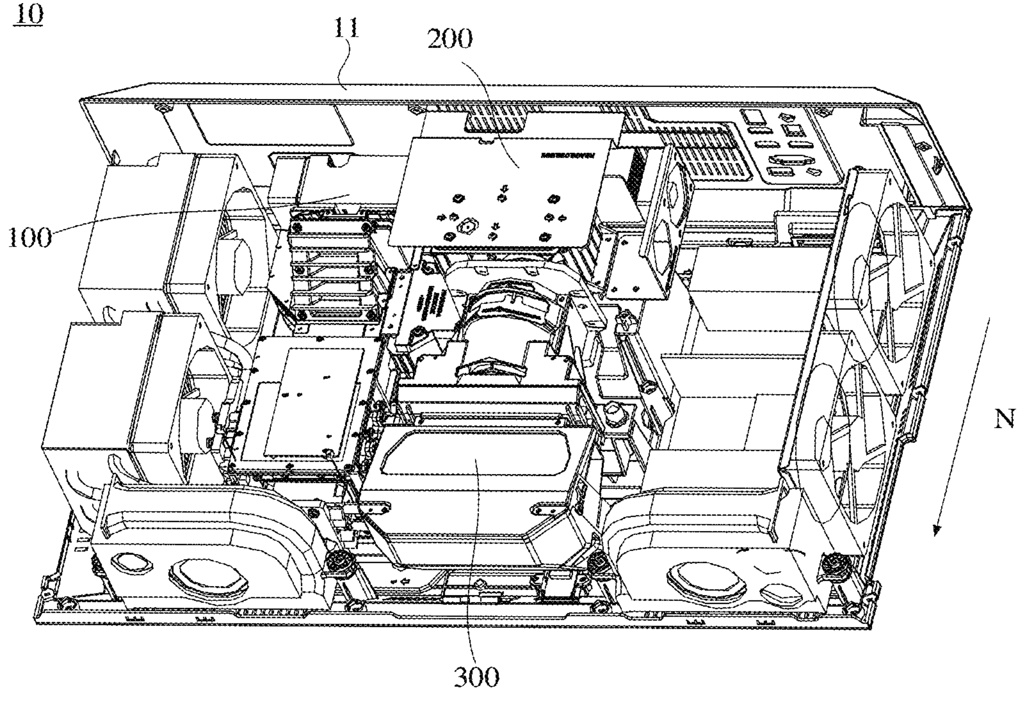
FIG. 1 is a structural diagram of a laser projection apparatus according to some embodiments.

Some embodiments of the present disclosure provide a laser projection apparatus. As shown in FIG. 1, the laser projection apparatus 10 includes housing 11 (only part of the housing is shown in FIG. 1), and a light source 100, an optical machine 200 and a lens head 300 that are mounted in the housing 11. The light source 100 is configured to provide an illumination beam (laser beam). The optical machine 200 is configured to modulate the illumination beam provided by the light source 100 by using an image signal to obtain a projection beam. The lens head 300 is configured to project the projection beam onto a projection screen or wall for imaging.

Figure 2:
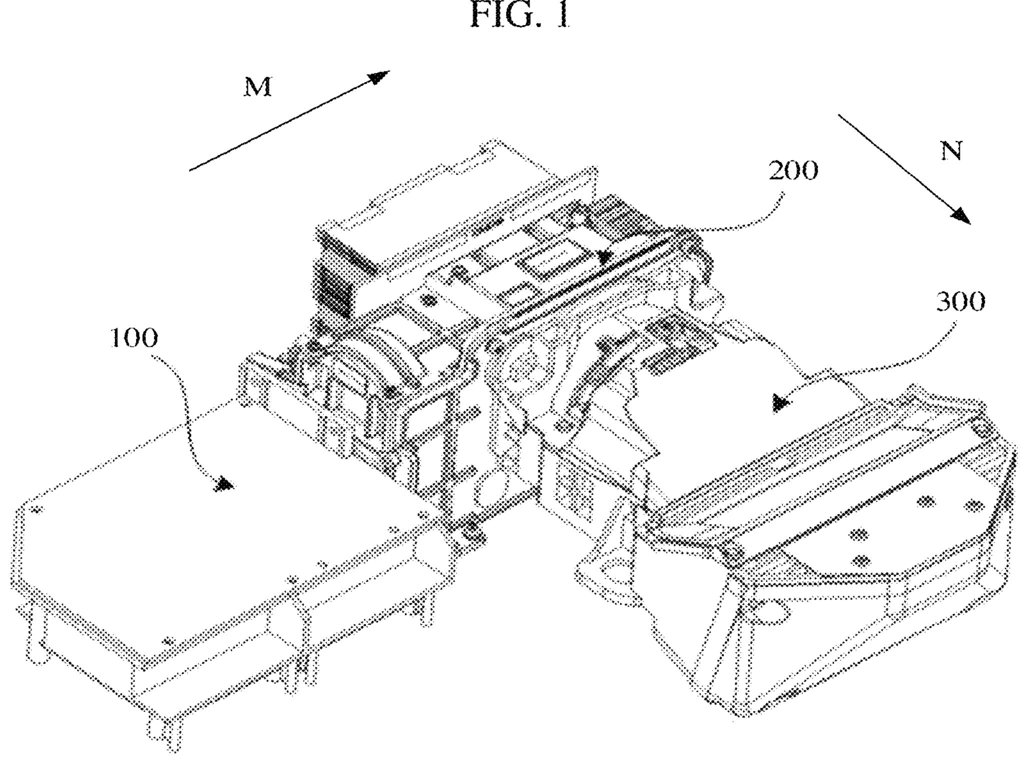
FIG. 2 is a structural diagram of a light source, an optical machine, and a lens head in a laser projection apparatus according to some embodiments.

In some embodiments, one end of the optical machine 200 is connected to the light source 100, and the other end of the optical machine 200 is connected to the lens head 300. The light source 100 and the optical machine 200 are disposed along an emergent direction of the illumination beam of the laser projection apparatus 10 (refer to the M direction shown in FIG. 2), and the optical machine 200 and the lens head 300 are disposed along an emergent direction of the projection beam of the laser projection apparatus 10 (refer to the N direction shown in FIG. 2). The M direction is substantially perpendicular to the N direction. That is, the light source 100, the optical machine 200, and the lens head 300 are connected in an "L" shape. On the one hand, this connecting structure can adapt to the optical path characteristics of the reflective light valve in the optical machine 200, and on the other hand, this connecting structure can shorten the length of the optical path in one dimension direction, which is beneficial to the structural arrangement of the laser projection apparatus 10. The reflective light valve will be described hereinafter.

In some embodiments, the light source 100 sequentially provides three primary color light (or adds other color of light on the basis of the three primary color light). Because of persistence of vision in human eyes, human eyes see white light formed by the mixture of the three primary color light. The light source 100 also outputs the three primary color light simultaneously and continuously emits white light.

Figure 3:
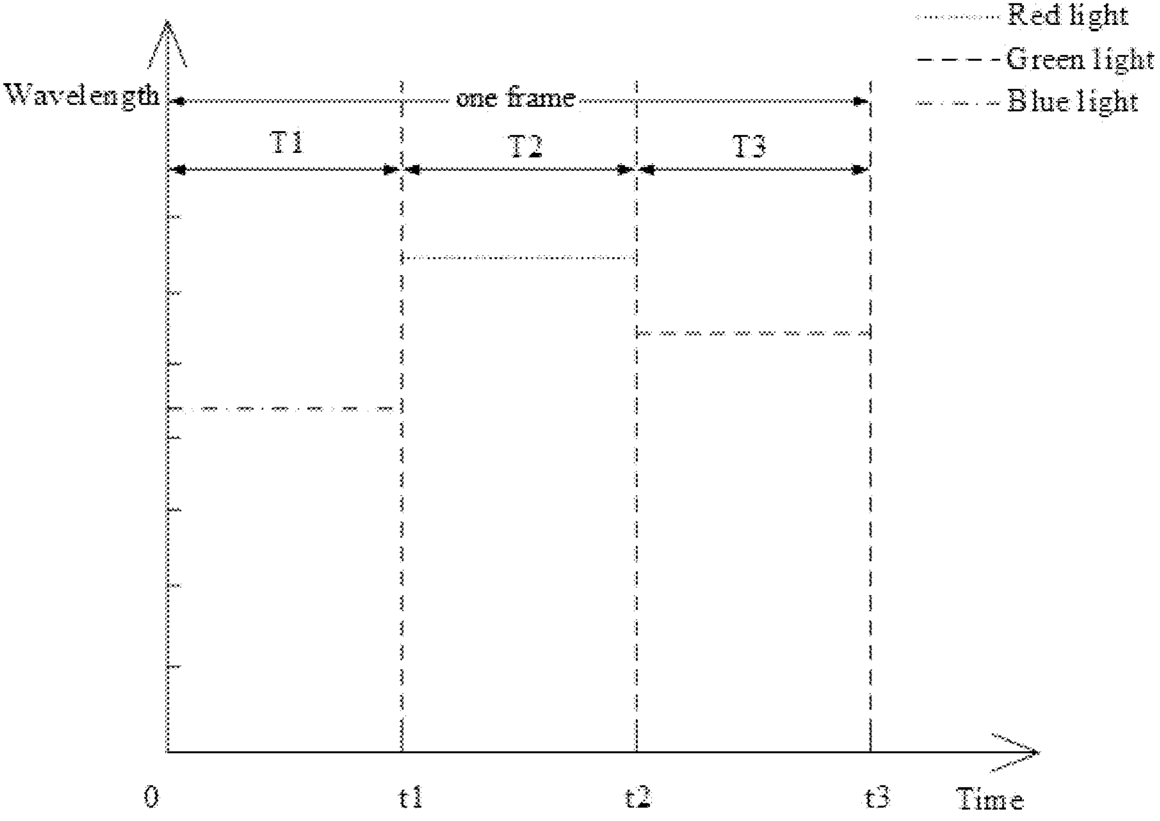
FIG. 3 is a timing diagram of a light source in a laser projection apparatus according to some embodiments.

Exemplarily, as shown in FIG. 3, in the projection process of one frame of target image, the light source 100 sequentially outputs second laser beam, first laser beam and third laser beam. The light source 100 outputs the second laser beam in the time period T1, outputs the first laser beam in the time period T2, and outputs the third laser beam in the time period T3. The time period during which the light source 100 completes one sequential output of the primary color beams is the cycle of outputting the primary color beams by the light source 100. During the display cycle of one frame of target image, the light source 100 sequentially outputs various primary color beams once. Therefore, the display cycle of one frame of target image is equal to the cycle of outputting the primary color beams by the light source 100, both of which are equal to the sum of T1, T2 and T3.

Figure 4:
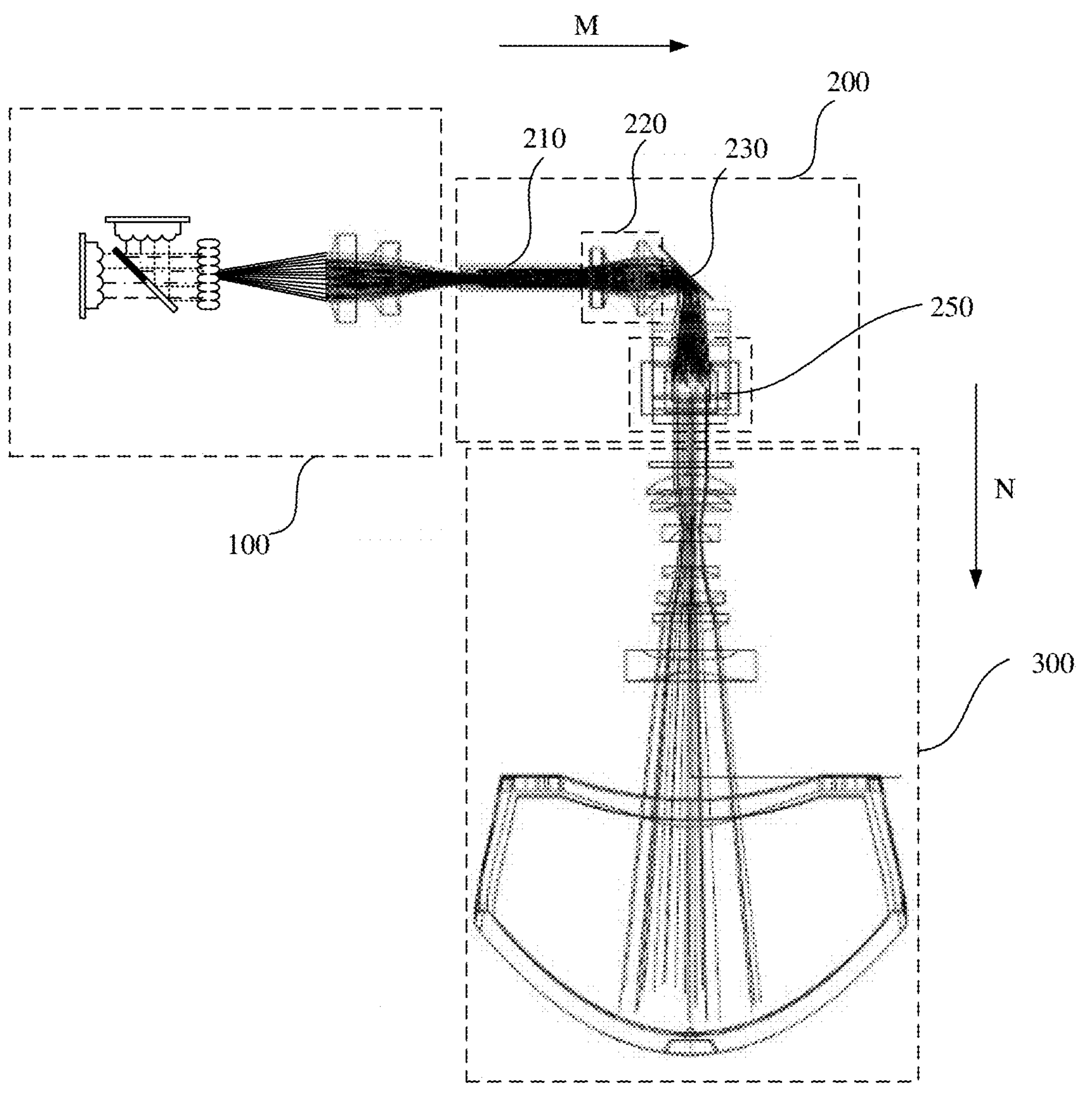
FIG. 4 is an optical path diagram of a light source, an optical machine, and a lens head in a laser projection apparatus according to some embodiments.
Figure 5:
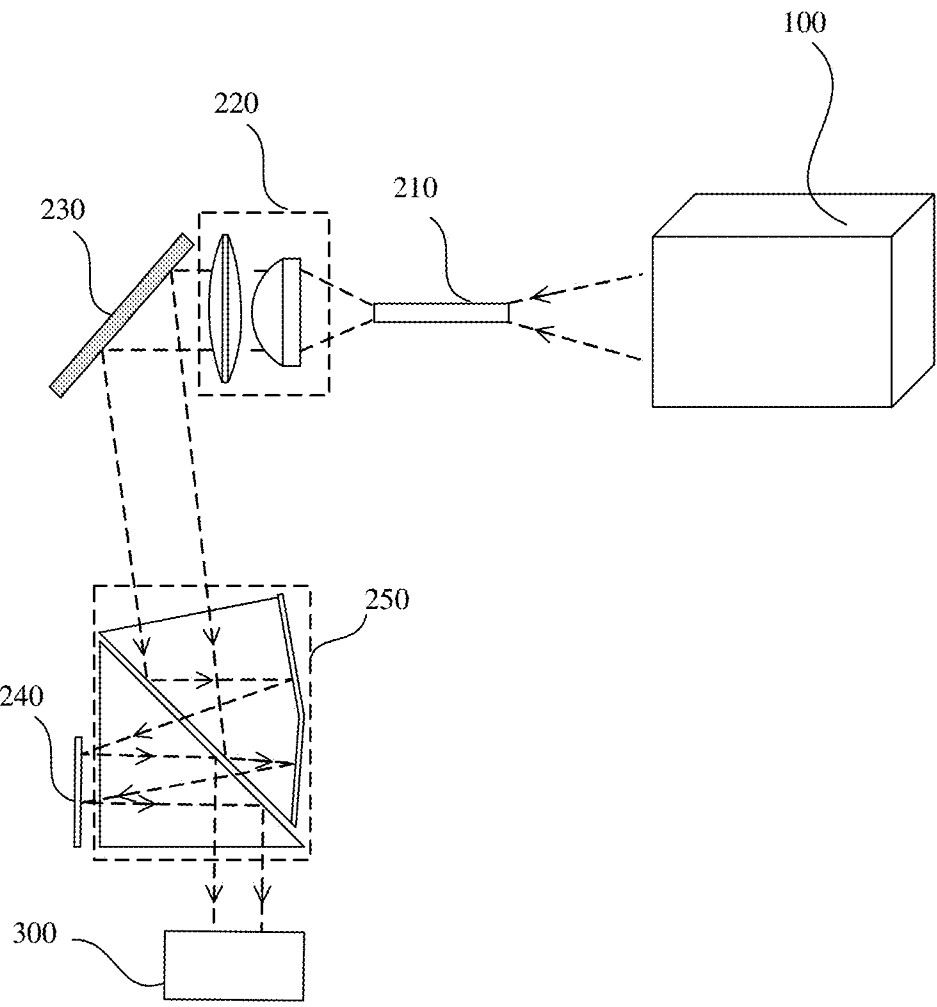
FIG. 5 is another optical path diagram of a light source, an optical machine, and a lens head in a laser projection apparatus according to some embodiments.

The illumination beam emitted from the light source 100 enters the optical machine 200. Referring to FIG. 4 and FIG. 5, the optical machine 200 includes a light pipe 210, a lens assembly 220, a reflector 230, a digital micromirror device (DMD) 240, and a prism assembly 250. The light pipe 210 receives the illumination beam provided by the light source 100 and homogenize the illumination beam. The lens assembly 220 first magnify the illumination beams and then converge and transmit the illumination beams to the reflector 230. The reflector 230 reflects the illumination beam to the prism assembly 250. The prism assembly 250 reflects the illumination beam to the digital micromirror device 240, and the digital micromirror device 240 modulates the illumination beam to obtain a projection beam, and reflects the projection beam to the lens head 300.

The digital micromirror device 240 is a core component in the optical machine 200, and the digital micromirror device 240 functions to modulate the illumination beam provided by the light source 100 by using an image signal, that is, to control the illumination beam to display different colors and brightness for different pixels of an image to be displayed, so as to finally form an optical image. Thus, the digital micromirror device 240 is also referred to as a light modulation device or a light valve. In addition, the optical machines 200 are classified into a single-chip system, a double-chip system, or a three-chip system according to the number of light modulation devices (or light valves) used in the optical machines 200. For example, in the optical machine 200 shown in FIG. 5, only one digital micromirror device 240 is used, and then the optical machine 200 is referred to as a single system. When three digital micromirror devices 240 are used, the optical machine 200 is referred to as a three system.

In the case that the optical machine 20 is a three system, the light source 100 simultaneously outputs the three primary color light to continuously emit white light.

Figure 6:
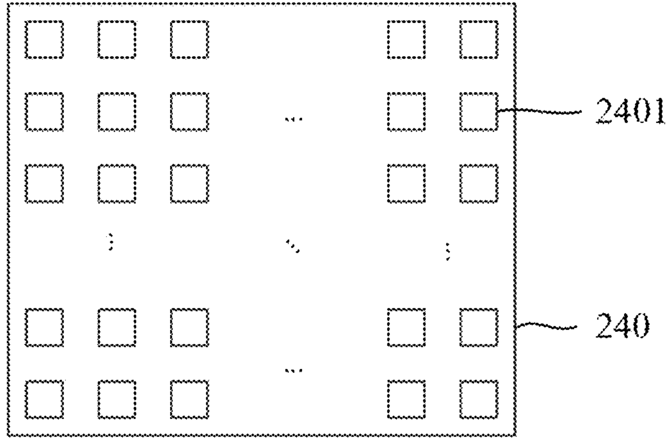
FIG. 6 is an arrangement diagram of micro-reflective mirrors in a digital micromirror device according to some embodiments.
Figure 7:
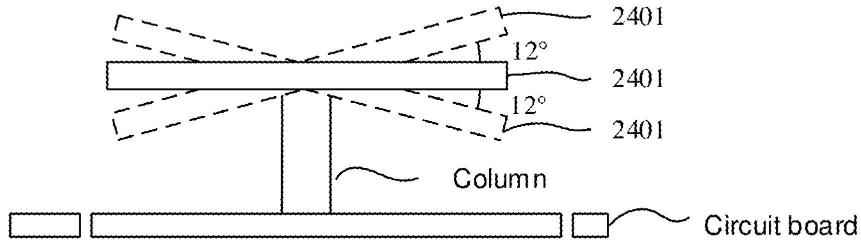
FIG. 7 is a position diagram of oscillation of one micro-reflective mirror in the digital micromirror device in FIG. 6.

As shown in FIG. 6, the digital micromirror device 240 includes thousands of micro-reflective mirrors 2401 which can be individually driven to rotate. The micro-reflective mirrors 2401 are arranged in an array, and each micro-reflective mirror 2401 corresponds to one pixel in the image to be displayed. As shown in FIG. 7, in the digital light processing (DLP) projection architecture, each micro-reflective mirrors 2401 is equivalent to a digital switch, which can oscillate in a range of plus or minus 12 degrees or plus or minus 17 degrees under the action of an applied electric field.

Figure 8:
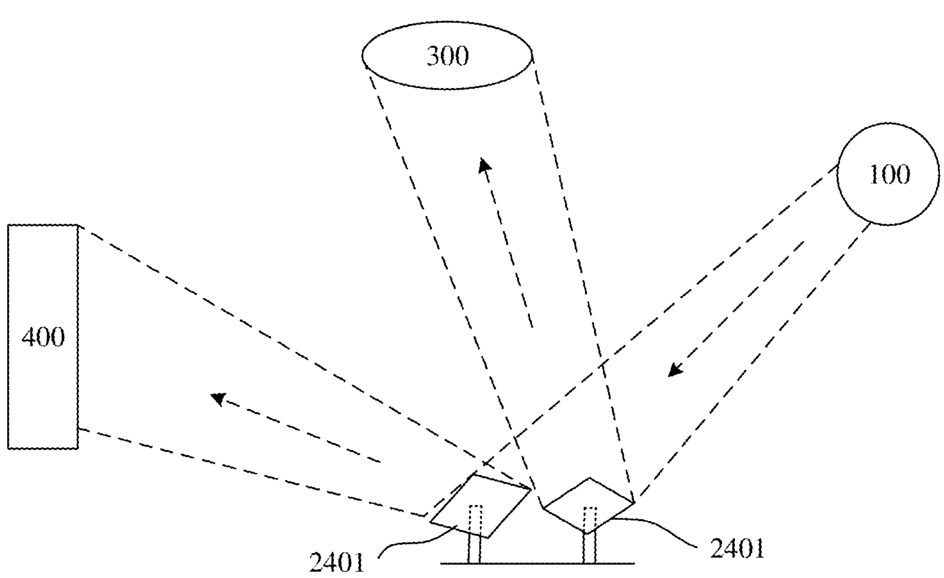
FIG. 8 is an operating schematic diagram of a micro-reflective mirror according to some embodiments.

As shown in FIG. 8, light reflected by the micro-reflective mirror 2401 at a negative deflection angle is referred to as OFF light, and the OFF light is ineffective light, which usually strikes the housing 11 of the laser projection apparatus 10, the housing of the optical machine 200, or a light absorption unit 400 and is absorbed. Light reflected by the micro-reflective mirror 2401 at a positive deflection angle is referred to as ON light, and the ON light is an illumination beam which is received and reflected by the micro-reflective mirror 2401 on the surface of the digital micromirror device 240 to the lens head 300. The ON light is an effective beam and is used for projection imaging. An ON state of the micro-reflective mirror 2401 is a state that the micro-reflective mirror 2401 is in and can maintain when the illumination beam emitted from the light source 100 enters the lens head 300 after being reflected by the micro-reflective mirror 2401, that is, a state in which the micro-reflective mirror 2401 is at a positive deflection angle. An off state of the micro-reflective mirror 2401 is a state that the micro-reflective mirror 2401 is in and can maintain when the illumination beam emitted from the light source 100 has not entered the lens head 300 after being reflected by the micro-reflective mirror 2401, that is, a state in which the micro-reflective mirror 2401 is at a negative deflection angle.

For example, for the micro-reflective mirror 2401 which is at the deflection angle of ±12°, the state in which the micro-reflective mirror 2401 is at +12° is the ON state, and the state in which the micro-reflective mirror 2401 is at −12° is the OFF state. The deflection angle between −12° and +12° is not used in practice, and the micro-reflective mirror 2401 only works in the ON state and OFF state in practice. For the micro-reflective mirror 2401 which is at the deflection angle of ±17°, the state in which the micro-reflective mirror 2401 is at +17° is the ON state, and the state in which the micro-reflective mirror 2401 is at −17° is the OFF state. The image signal is converted into digital codes of 0 and 1 after being processed, and these digital codes drive the micro-reflective mirror 2401 to oscillate.

During the display cycle of one frame of image, some or all of the micro-reflective mirrors 2401 switch once between the ON state and the OFF state, and the grayscale of each pixel in one frame of image is realized according to the duration of the ON state and OFF state respectively of the micro-reflective mirrors 2401. For example, when the pixel has 256 grayscales of 0 to 255, the micro-reflective mirror corresponding to the grayscale 0 is in the OFF state in the whole display cycle of one frame of image, the micro-reflective mirror corresponding to the grayscale 255 is in the ON state in the whole display cycle of one frame of image, and the micro-reflective mirror corresponding to the grayscale 127 is in the ON state in half of the display cycle of one frame of image and is in the OFF state in the other half of the display cycle. Therefore, the brightness (grayscale) of the corresponding pixel of the micro-reflective mirror 2401 can be controlled by controlling the state of each micro-reflective mirror in the digital micromirror device 240 in the display cycle of one frame of image and the duration of each state by using the image signal, thereby achieving the purpose of modulating the illumination beam projected to the digital micromirror device 240.

As shown in FIG. 4, the lens head 300 includes a plurality of lenses, which are generally grouped into three sections, including a front group, a middle group, and a rear group, or grouped into two section, including a front group and a rear group. The front group is a mirror group proximal to the light-output side of the laser projection apparatus 10 (that is, the side of the lens head 300 distal from the optical machine 200 along the N direction), and the rear group is a mirror group proximal to the light-output side of the optical machine 200 (that is, the side of the lens head 300 proximal to the optical machine 200 along the N direction). The lens head 300 is a zoom lens head, or a fixed-focus adjustable lens head, or a fixed-focus lens head.

Figure 9:
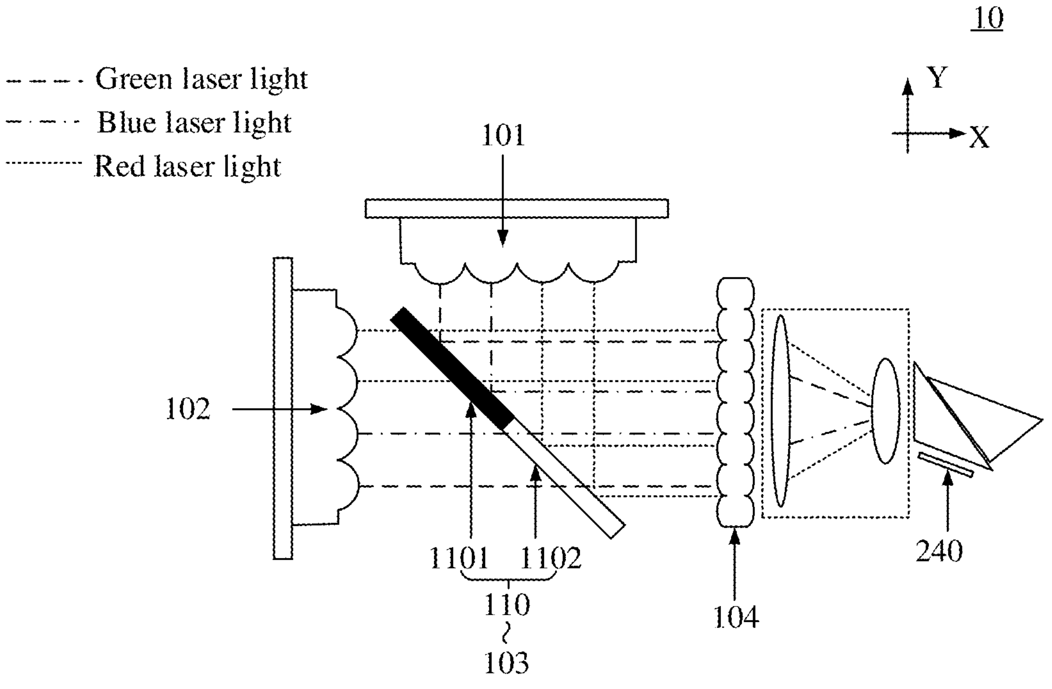
FIG. 9 is a structural diagram of a light source and an optical machine in a laser projection apparatus according to some embodiments.

In the related art, when a laser beam is incident into the light pipe, in order to have a good homogenization effect on the laser beam, the light pipe is longer, usually above 30 mm. As a result, the volume of the entire laser projection apparatus is relatively large. In view of this, some embodiments of the present disclosure provide a light source. Referring to FIG. 9, the light source 100 includes a first laser array 101, a second laser array 102, a light combining assembly 102, and a fly-eye lens 104.

In some embodiments, the first laser array 101 and the second laser array 102 are configured to emit at least one color of laser light, such that the light source 100 emits at least two colors of laser light. The first laser array 101 and the second laser array 102 each include a plurality of lasers arranged in an array, and each of the lasers includes one light-emitting chip. That is, both the first laser array 101 and the second laser array 102 include a plurality of light-emitting chips arranged in an array. Exemplarily, the plurality of lasers emit three colors of laser light, such as red laser light corresponding to a first wavelength laser light, green laser light corresponding to a second wavelength laser light, and blue laser light corresponding to a third wavelength laser light. In this case, the plurality of lasers include a first laser for emitting the first wavelength laser light, a third laser for emitting the third wavelength laser light, and a second laser for emitting the second wavelength laser light.

It should be noted that some embodiments of the present disclosure are illustratively described by taking an example in which the first laser array 101 and the second laser array 102 simultaneously emit three colors of laser light, i.e., a second wavelength laser light, a third wavelength laser light, and a first wavelength laser light. In addition, the first laser array 101 and the second laser array 102 may also simultaneously emit two colors of laser light, such as blue laser light and yellow laser light.

In some embodiments, the first laser array 101 and the second laser array 102 have the same structure or different structures.

Figure 20:
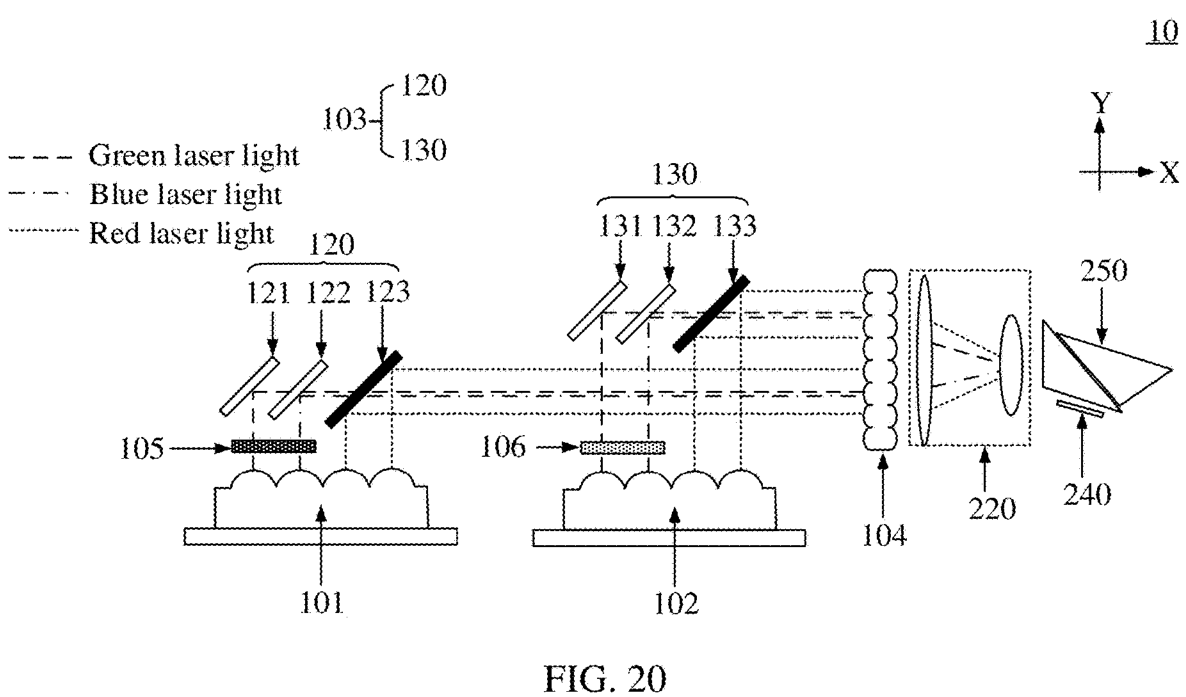
FIG. 20 is still another structural diagram of a light source and an optical machine in a laser projection apparatus according to some embodiments.

Exemplarily, as shown in FIG. 9 and FIG. 20, the first laser array 101 and the second laser array 102 have the same structure, and both include a plurality of lasers arranged in four rows. The plurality of lasers include two rows of first lasers for emitting a first wavelength laser light, one row of third lasers for emitting a third wavelength laser light, and one row of second lasers for emitting a second wavelength laser light. In this way, the first laser array 101 and the second laser array 102 can simultaneously emit the first wavelength laser light, third wavelength laser light, and second wavelength laser light through the first lasers, third lasers, and second lasers.

Figures 22, 23:
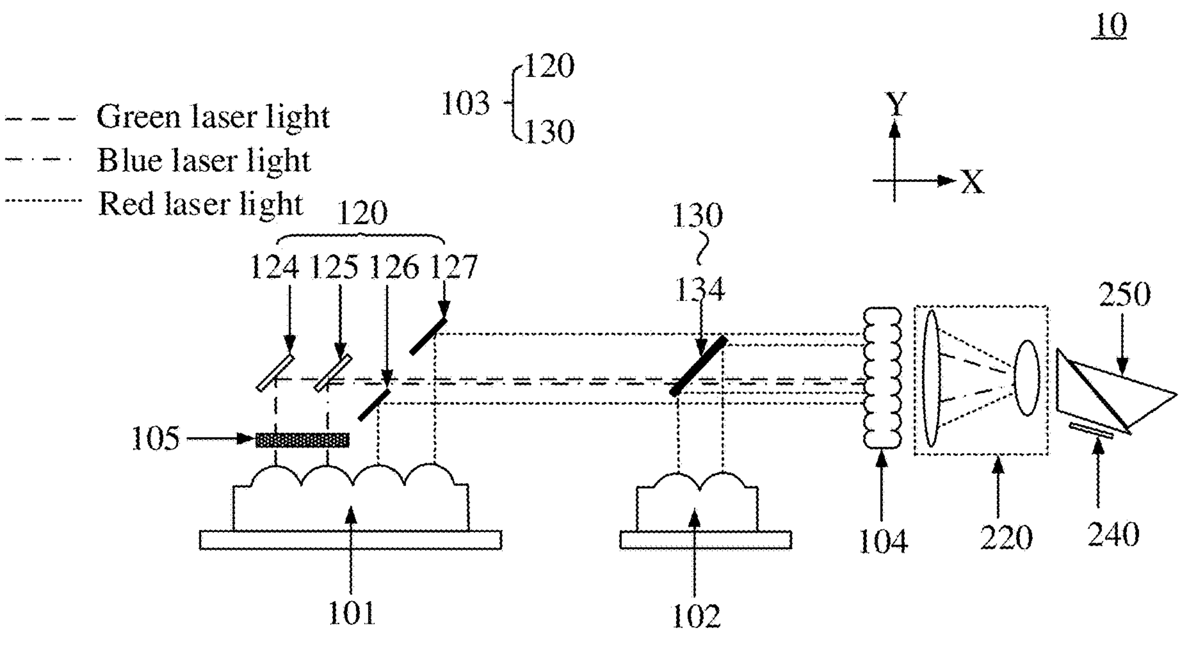
FIG. 22 is still another structural diagram of a light source and an optical machine in a laser projection apparatus according to some embodiments.
FIG. 23 is an effect diagram of a light spot of combined light from the laser array shown in FIG. 22 incident on a fly-eye lens.

Exemplarily, as shown in FIG. 22, the first laser array 101 and the second laser array 102 have different structures. For example, the first laser array 101 includes a plurality of lasers arranged in four rows, and the plurality of lasers include two rows of first lasers for emitting a first wavelength laser light, one row of third lasers for emitting a third wavelength laser light, and one row of second lasers for emitting a second wavelength laser light. The second laser array 102 includes a plurality of lasers arranged in two rows, and the plurality of lasers are first lasers.

Figure 24:
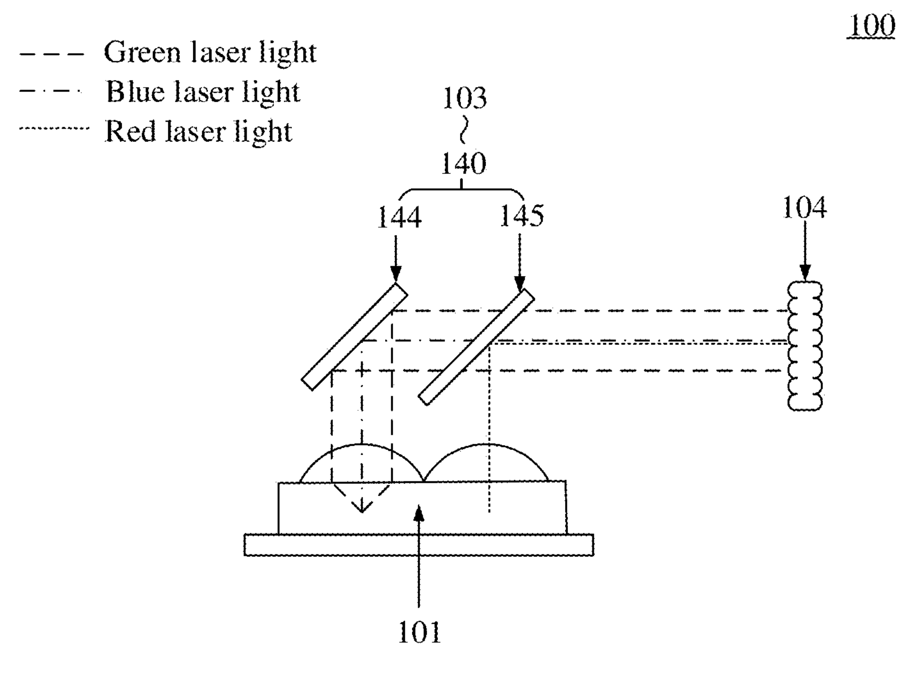
FIG. 24 is a structural diagram of still another light source according to some embodiments.
Figure 25:
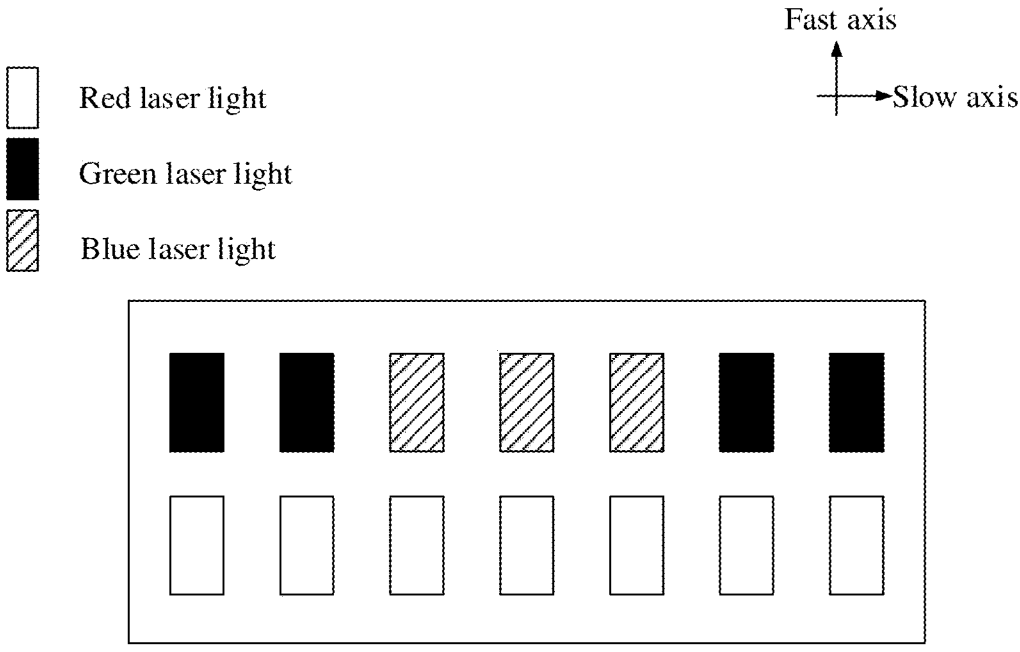
FIG. 25 is a schematic diagram showing distribution of lasers in the laser array shown in FIG. 24.

In addition, the plurality of lasers may also be arranged in other ways. Exemplarily, as shown in FIG. 24 and FIG. 25, the first laser array 101 includes a plurality of lasers arranged in two rows and seven columns. The plurality of lasers include one row of first lasers for emitting a first wavelength laser light, and one row of second lasers for emitting a second wavelength laser light and third lasers for emitting a third wavelength laser light.

Figure 30:
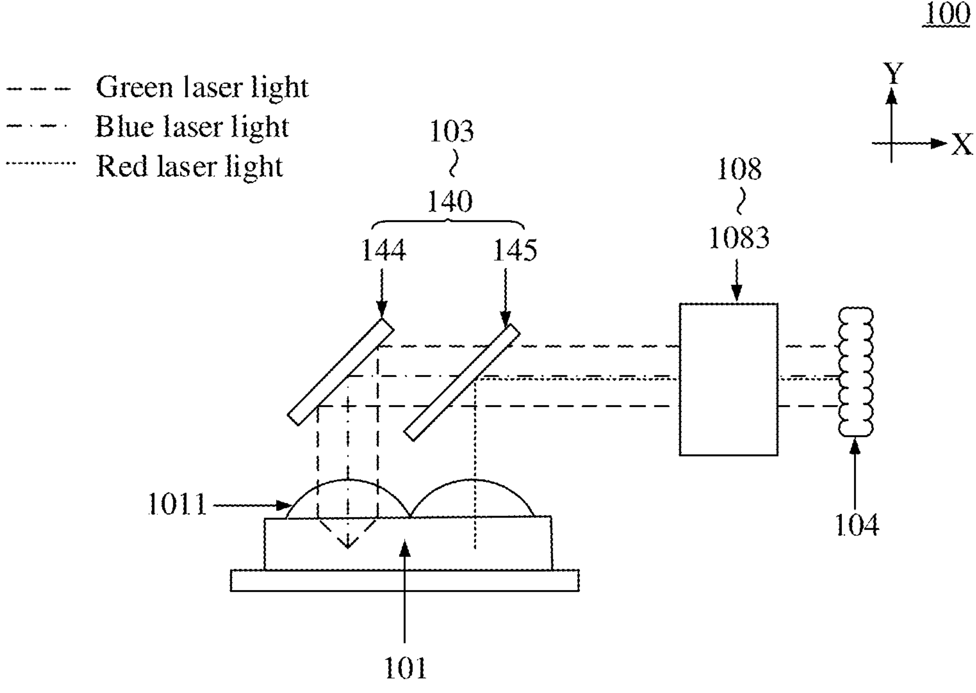
FIG. 30 is a structural diagram of yet another light source according to some embodiments.

In some embodiments, referring to FIG. 30, the first laser array 101 and the second laser array 102 further include a plurality of collimating lenses 1011. Each laser in the first laser array 101 and the second laser array 102 corresponds to one collimating lens 1011, that is, each light-emitting chip corresponds to one collimating lens 1011. The collimating lens 1011 is configured to collimate the laser light emitted from the corresponding laser, and guide the laser light to the light combining assembly 103.

The first laser array 101 is configured to emit a first laser beam to the light combining assembly 103, and the second laser array 102 is configured to emit a second laser beam to the light combining assembly 103. The light combining assembly 103 is configured to guide the first laser beam and the second laser beam to the fly-eye lens 104, and the fly-eye lens 104 is configured to guide the first laser beam and the second laser beam to the optical machine 200. The optical machine 200 is configured to modulate and guide the first laser beam and the second laser beam to the lens head 300.

In some embodiments, the light-output direction of the first laser array 101 (Y-axis direction as shown in FIG. 9) is perpendicular to the light-output direction of the second laser array 102 (X-axis direction as shown in FIG. 9), and the light combining assembly 103 includes a first light combining component 110. The first light combining component 110 is disposed on the light-output sides of the first laser array 101 and the second laser array 102, and the fly-eye lens 104 is disposed on the side of the first light combining component 110 distal from the second laser array 102. The arrangement direction of the first laser array 101 and the first light combining component 110 (Y-axis direction as shown in FIG. 9) is perpendicular to the arrangement direction of the second laser array 102 and the first light combining component 110 (X-axis direction as shown in FIG. 9). The arrangement direction of the second laser array 102 and the first light combining component 110 (X-axis direction as shown in FIG. 9) is parallel to the arrangement direction of the first light combining component 110 and the fly-eye lens 104.

The first laser beam emitted from the first laser array 101 and the second laser beam emitted from the second laser array 102 are guided to the first light combining component 110, the first light combining component 110 reflects the first laser beam to the fly-eye lens 104 and transmits the second laser beam to the fly-eye lens 104, and the fly-eye lens 104 homogenizes the received laser beams.

Figure 13:
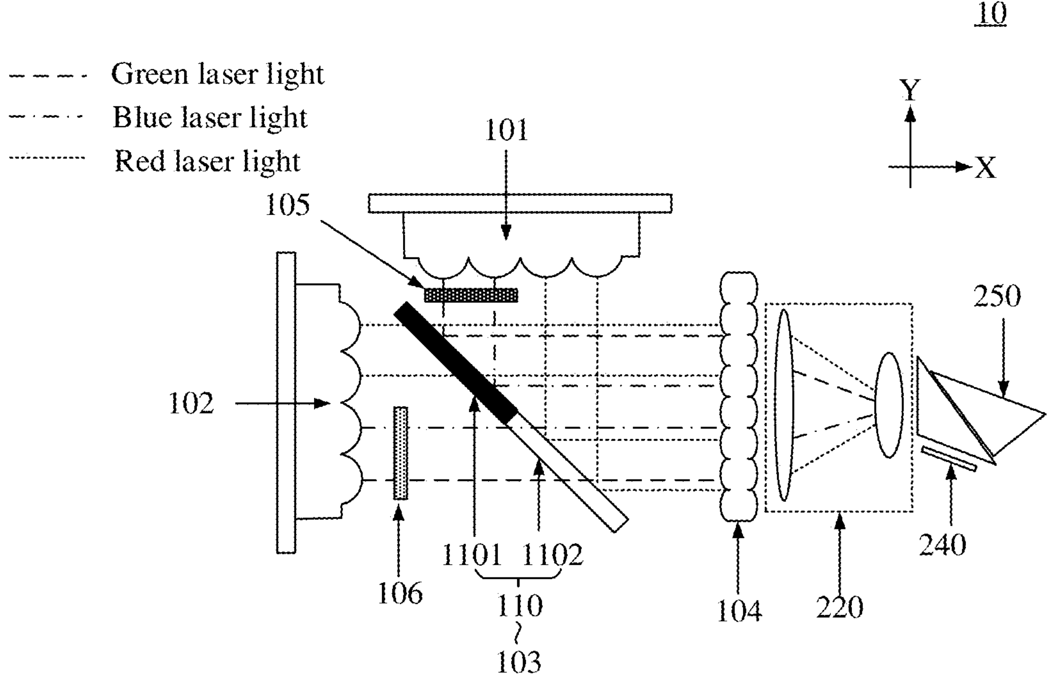
FIG. 13 is a structural diagram of another light source and an optical machine in a laser projection apparatus according to some embodiments.

In some embodiments, referring to FIG. 13, the first light combining component 110 is an integrated structure including a first light combining element 1101 and a second light combining element 1102. The first light combining element 1101 and the second light combining element 1102 are both aslant arranged, and are disposed at an intersection of the outgoing light beams of the first laser array 101 and the second laser array 102. On the plane of the light-incident surface of the fly-eye lens 104, the orthographic projection of the first light combining element 1101 and the orthographic projection of the second light combining element 1102 are staggered, that is, not overlapped.

The first laser array 101 emits a first laser beam to the first light combining element 1101 and the second light combining element 1102, and the second laser array 102 emits a second laser beam to the first light combining element 1101 and the second light combining element 1102. Exemplarily, the first laser beam and the second laser beam both include three colors of laser light, for example, a second wavelength laser light, a third wavelength laser light, and a first wavelength laser light. The first laser array 101 emits the second wavelength laser light and the third wavelength laser light to the first light combining element 1101 and emits the first wavelength laser light to the second light combining element 1102. The second laser array 102 emits the first wavelength laser light to the first light combining element 1101 and emits the second wavelength laser light and the third wavelength laser light to the second light combining element 1102. The first light combining element 1101 is configured to reflect the second wavelength laser light and the third wavelength laser light emitted from the first laser array 101 to the fly-eye lens 104 and transmit the first wavelength laser light emitted from the second laser array 102 to the fly-eye lens 104. The second light combining element 1102 is configured to reflect the first wavelength laser light emitted from the first laser array 101 to the fly-eye lens 104 and transmit the second wavelength laser light and the third wavelength laser light emitted from the second laser array 102 to the fly-eye lens 104.

In some embodiments, the first light combining element 1101 and the second light combining element 1102 of the first light combining part 110 are dichroic elements with different wavelength selection characteristics. For example, the first light combining element 1101 is a dichroic filter that reflects a second wavelength laser light and a third wavelength laser light and transmits other colors of laser light; and the second light combining element 1102 is a dichroic filter that reflects a first wavelength laser light and transmits other colors of laser light. Therefore, the first laser array 101 and the second laser array 102 achieve light combination through the first light combining component 110 with different wavelength selection characteristics, which is compact in the optical path and beneficial to miniaturization.

In some other embodiments, the first light combining element 1101 and the second light combining element 1102 of the first light combining component 110 are polarizing elements with different polarization selection characteristics. For example, the first laser array 101 and the second laser array 102 respectively emit three-color laser beams with different polarization characteristics. Taking the first wavelength laser light being P-polarized light and the blue and the third wavelength laser light being S-polarized light as an example, the first light combining element 1101 is a polarizer that reflects the S-polarized light, i.e., the second wavelength laser light and the third wavelength laser light, and transmits the P-polarized light, i.e., the first wavelength laser light; and the second light combining element 1102 is a polarizer that reflects the P-polarized light, i.e., the first wavelength laser light, and transmits the S-polarized light, i.e., the second wavelength laser light and the third wavelength laser light. Therefore, the first laser array 101 and the second laser array 102 achieve light combination through the first light combining component 110 with different polarization selection characteristics, which is compact in the optical path and beneficial to miniaturization.

In some other embodiments, as shown in FIG. 20 and FIG. 22, the light-output direction of the first laser array 101 (i.e., the Y-axis direction in the figure) is parallel to the light-output direction of the second laser array 102 (i.e., the Y-axis direction in the figure). The light combining assembly 103 includes a second light combining component 120 and a third light combining component 130. The second light combining component 120 is disposed on the light-output side of the first laser array 101, and the third light combining component 130 is disposed on the light-output side of the second laser array 102. The fly-eye lens 104 is disposed on the side of the third light combining component 130 distal from the second light combining component 120. The arrangement direction of the first laser array 101 and the second light combining component 120 is parallel to the arrangement direction of the second laser array 102 and the third light combining component 130. The arrangement direction of the fly-eye lens 104 and the third light combining component 130 is perpendicular to the arrangement direction of the third light combining component 130 and the second laser array 102.

The first laser array 101 emits a first laser beam to the second light combining component 120, and the second laser array 102 emits a second laser beam to the third light combining component 130. The second light combining component 120 is configured to reflect the first laser beam to the fly-eye lens 104, the third light combining component 130 is configured to reflect the second laser beam to the fly-eye lens 104, and the fly-eye lens 104 homogenizes the received laser beams.

In some embodiments, as shown in FIG. 20, the first laser beam and the second laser beam both include three colors of laser light, for example, the third wavelength laser light, the second wavelength laser light, and the first wavelength laser light. In this case, the second light combining component 120 and the third light combining component 130 have the same structure, and the second light combining component 120 and the third light combining component 130 are staggered on the plane of the light-incident surface of the fly-eye lens 104.

The second light combining component 120 includes a first mirror 121, a second mirror 122, and a third mirror 123. The first mirror 121, the second mirror 122 and the third mirror 123 are sequentially arranged along the X-axis direction, and are aslant arranged. On the plane of the light-incident surface of the fly-eye lens 104, an orthographic projection of the first mirror 121, an orthographic projection of the second mirror 122, and an orthographic projection of the third mirror 123 are at least partially overlapped with each other.

The first laser array 101 emits the third wavelength laser light to the first mirror 121, emits the second wavelength laser light to the second mirror 122, and emits the first wavelength laser light to the third mirror 123. The first mirror 121 is configured to reflect the third wavelength laser light, the second mirror 122 is configured to reflect the second wavelength laser light and transmit the third wavelength laser light, and the third mirror 123 is configured to reflect the first wavelength laser light and transmit the third wavelength laser light and the second wavelength laser light.

In some embodiments, the first mirror 121 in the second light combining component 120 is a reflector for reflecting all colors of light, or a dichroic filter for reflecting the third wavelength laser light and transmitting other colors of laser light; the second mirror 122 is a dichroic filter for reflecting the second wavelength laser light and transmitting other colors of laser light; and the third mirror 123 is a dichroic filter for reflecting the first wavelength laser light and transmitting other colors of laser light.

The third light combining component 130 includes a first mirror 131, a second mirror 132, and a third mirror 133. The first mirror 131, the second mirror 132 and the third mirror 133 are sequentially arranged along the X-axis direction, and are aslant arranged. On the plane of the light-incident surface of the fly-eye lens 104, an orthographic projection of the first mirror 131, an orthographic projection of the second mirror 132, and an orthographic projection of the third mirror 133 are at least partially overlapped with each other.

The second laser array 102 emits the third wavelength laser light to the first mirror 131, emits the second wavelength laser light to the second mirror 132, and emits first wavelength laser light to the third mirror 133. The first mirror 131 is configured to reflect the third wavelength laser light, the second mirror 132 is configured to reflect the second wavelength laser light and transmit the third wavelength laser light, and the third mirror 133 is configured to reflect the first wavelength laser light and transmit the third wavelength laser light and the second wavelength laser light.

In some embodiments, the first mirror 131 in the third light combining component 130 is a reflector for reflecting all colors of light, or a dichroic filter for reflecting the third wavelength laser light and transmitting other colors of laser light; the second mirror 132 is a dichroic filter for reflecting the second wavelength laser light and transmitting other colors of laser light; and the third mirror 133 is a dichroic filter for reflecting the first wavelength laser light and transmitting other colors of laser light.

When the polarization polarity of the second wavelength laser light and the third wavelength laser light emitted from the first laser array 101 and the second laser array 102 is opposite to that of the first wavelength laser light, for example, the second wavelength laser light and the third wavelength laser light are S-polarized light, and the first wavelength laser light is P-polarized light, as shown in FIG. 13 and FIG. 20, the light source 100 further includes a first polarization conversion component 105 and a second polarization conversion component 106. The first polarization conversion component 105 is configured to convert the third wavelength laser light and the second wavelength laser light emitted from the first laser array 101 from the S-polarized light into the P-polarized light, and the second polarization conversion component 106 is configured to convert the third wavelength laser light and the second wavelength laser light emitted from the second laser array 102 from the S-polarized light into the P-polarized light. In this way, the polarization directions of the second wavelength laser light and the third wavelength laser light incident into the fly-eye lens 104 are the same as the polarization direction of the first wavelength laser light. Thus, the laser light with the same polarization direction is used to form the projection picture, which can prevent color blocks from occurring in the formed projection picture due to different transmissive and reflective efficiencies of the optical lens for different polarized light. Exemplarily, both the first polarization conversion component 105 and the second polarization conversion component 106 are half-wave plates.

In some embodiments, as shown in FIG. 13, the first polarization conversion component 105 is disposed between the first laser array 101 and the first light combining element 1101 of the first light combining component 110, and the second polarization conversion component 106 is disposed between the second laser array 102 and the second light combining element 1102 of the first light combining component 110. Alternatively, as shown in FIG. 20, the first polarization conversion component 105 is disposed between the first laser array 101 and the first mirror 121 and the second mirror 122 of the second light combining component 120, and the second polarization conversion component 106 is disposed between the second laser array 102 and the first mirror 131 and the second mirror 132 of the third light combining component 130.

It can be understood that the first polarization conversion component 105 and the second polarization conversion component 106 are only applicable to the case in which the first light combining component 110 combines light by means of the wavelength selection characteristics.

In some other embodiments, as shown in FIG. 22, the first laser beam includes three colors of laser light, for example, a third wavelength laser light, a second wavelength laser light, and a first wavelength laser light; and the second laser beam includes one color of laser light, for example, the first wavelength laser light. In this case, the second light combining component 120 includes a fourth mirror 124, a fifth mirror 125, a sixth mirror 126, and a seventh mirror 127, and the third light combining component 130 includes a fourth mirror 134. On the plane of the light-incident surface of the fly-eye lens 104, an orthographic projection of the fourth mirror 124 is at least partially overlapped with an orthographic projection of the fifth mirror 125, and orthographic projections of the sixth mirror 126 and the seventh mirror 127 are respectively on two opposite sides of the orthographic projections of the fourth mirror 124 and the fifth mirror 125. The orthographic projection of the fourth mirror 134 is at least partially overlapped with the orthographic projection of the fourth mirror 124 and the fifth mirror 125, and is staggered from the orthographic projections of the sixth mirror 126 and the seventh mirror 127.

The first laser array 101 emits the third wavelength laser light to the fourth mirror 124, emits the second wavelength laser light to the fifth mirror 125, and emits the first wavelength laser light to the sixth mirror 126 and the seventh mirror 127. The fourth mirror 124 is configured to reflect the third wavelength laser light, the fifth mirror 125 is configured to reflect the second wavelength laser light and transmit the third wavelength laser light, and the sixth mirror 126 and seventh mirror 127 are configured to reflect the first wavelength laser light. The second laser array 102 emits the first wavelength laser light to the fourth mirror 134, and the third wavelength laser light and the second wavelength laser light emitted from the first laser array 101 are respectively reflected by the fourth mirror 124 and the fifth mirror 125 to the fourth mirror 134. The fourth mirror 134 is configured to reflect the first wavelength laser light emitted from the second laser array 102 and transmit the third wavelength laser light and the second wavelength laser light emitted from the first laser array 101.

In some embodiments, the fourth mirror 124 of the second light combining component 120 is a reflector for reflecting all colors of laser light, or a dichroic filter for reflecting the third wavelength laser light and transmitting other colors of laser light; the fifth mirror 125 is a dichroic filter for reflecting the second wavelength laser light and transmitting other colors of laser light; the sixth mirror 126 and the seventh mirror 127 are reflectors for reflecting all colors of laser light, or dichroic filters for reflecting the first wavelength laser light and transmitting other colors of laser light; and the fourth mirror 134 of the third light combining component 130 is a dichroic filter for reflecting the first wavelength laser light and transmitting other colors of laser light.

Figure 15:
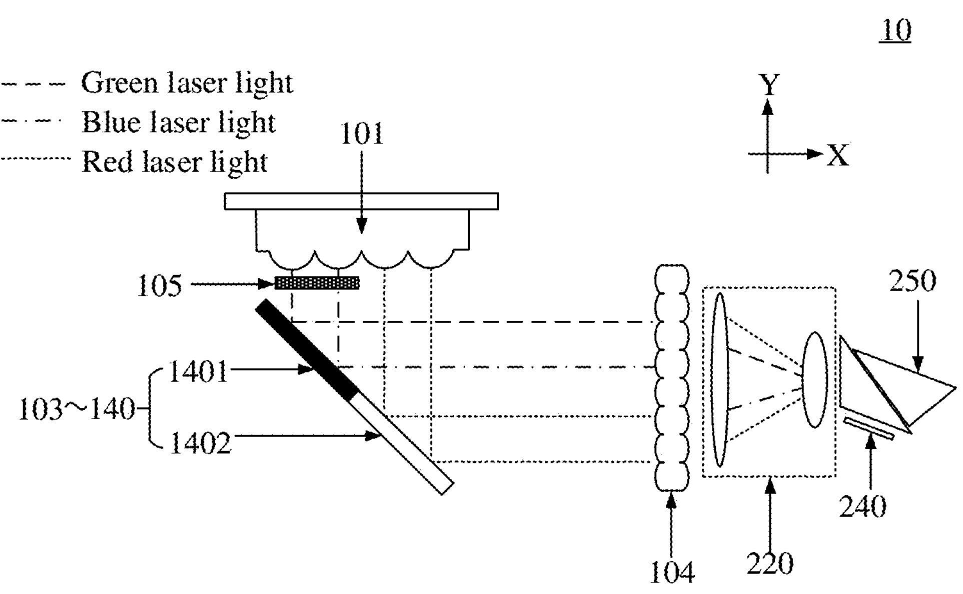
FIG. 15 is still another structural diagram of a light source and an optical machine in a laser projection apparatus according to some embodiments.

It should be noted that the above embodiments are illustratively described by taking an example in which the light source 100 includes two laser arrays. In some other embodiments, the light source 100 includes one laser array. Referring to FIG. 15, the light source 100 only includes the first laser array 101, the light combining assembly 103, and the fly-eye lens 104, but does not include the second laser array 102. The light combining assembly 103 includes a fourth light combining component 140, the fourth light combining component 140 is disposed on the light-output side of the first laser array 101, and an arrangement direction of the first laser array 101 and the fourth light combining component 140 is perpendicular to an arrangement direction of the fourth light combining component 140 and the fly-eye lens 104.

The first laser array 101 emits a first laser beam to the fourth light combining component 140, the fourth light combining component 140 reflects the first laser beam to the fly-eye lens 104, and the fly-eye lens 104 homogenizes the received laser beam. The fourth light combining component 140 has various structures, and the structure of the fourth light combining component 140 is described in some embodiments of the present disclosure by taking an example in which the first laser beam includes three colors of laser light, for example, the second wavelength laser light, the third wavelength laser light, and the first wavelength laser light.

In a first case, as shown in FIG. 15, the fourth light combining component 140 is an integrated structure including a first reflective part 1401 and a second reflective part 1402. On the plane of the light-incident surface of the fly-eye lens 104, an orthographic projection of the first reflective part 1401 and an orthographic projection of the second reflective part 1402 are staggered, that is, not overlapped.

The first laser array 101 emits the second wavelength laser light and the third wavelength laser light to the first reflective part 1401, and emits the first wavelength laser light to the second reflective part 1402. The first reflective part 1401 is configured to reflect the second wavelength laser light and the third wavelength laser light to the fly-eye lens 104, and the second reflective part 1402 is configured to reflect the first wavelength laser light to the fly-eye lens 104.

In some embodiments, the first reflective part 1401 of the fourth light combining component 140 is a reflector for reflecting all colors of laser light, or a dichroic filter for reflecting the third wavelength laser light and the second wavelength laser light and transmitting other colors of laser light; and the second reflective part 1402 is a reflector for reflecting all colors of laser light, or a dichroic filter for reflecting the first wavelength laser light and transmitting other colors of laser light. It can be understood that, when both the first reflective part 1401 and the second reflective part 1402 are dichroic filters, the fourth light combining component 140 and the first light combining component 110 have the same structure.

Figure 16:
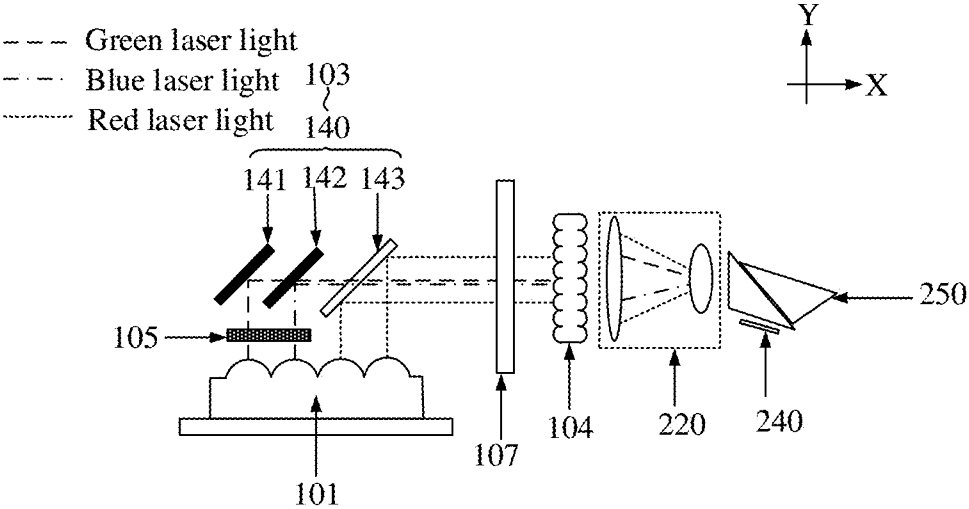
FIG. 16 is still another structural diagram of a light source and an optical machine in a laser projection apparatus according to some embodiments.

In a second case, referring to FIG. 16, the fourth light combining component 140 includes a first mirror 141, a second mirror 142, and a third mirror 143 which are independently arranged, and the first mirror 141, the second mirror 142, and the third mirror 143 are sequentially arranged along the X-axis direction. On the plane of the light-incident surface of the fly-eye lens 104, an orthographic projection of the first mirror 141, an orthographic projection of the second mirror 142, and an orthographic projection of the third mirror 143 are at least partially overlapped with each other.

The first laser array 101 emits the third wavelength laser light to the first mirror 141, emits the second wavelength laser light to the second mirror 142, and emits the first wavelength laser light to the third mirror 143. The first mirror 141 is configured to reflect the third wavelength laser light, the second mirror 142 is configured to transmit the third wavelength laser light and reflect the second wavelength laser light, and the third mirror 143 is configured to transmit the third wavelength laser light and the second wavelength laser light and reflect the first wavelength laser light.

In some embodiments, the first mirror 141 of the fourth light combining component 140 is a reflector for reflecting all colors of laser light, or a dichroic filter for reflecting the third wavelength laser light and transmitting laser other colors of light; the second mirror 142 is a dichroic filter for reflecting the second wavelength laser light and transmitting other colors of laser light; and the third mirror 143 is a dichroic filter for reflecting the first wavelength laser light and transmitting other colors of laser light. In this case, the fourth light combining component 140 has the same structure as the second light combining component 120 and the third light combining component 130.

In a third case, as shown in FIG. 24, the fourth light combining component 140 includes a fourth mirror 144 and a fifth mirror 145. The fourth mirror 144 and the fifth mirror 145 are sequentially arranged along the X-axis direction, and on the plane of the light-incident surface of the fly-eye lens 104, the orthographic projection of the fourth mirror 144 and the orthographic projection of the fifth mirror 145 are at least partially overlapped with each other.

The first laser array emits the third wavelength laser light and the second wavelength laser light to the fourth mirror 144, and emits the first wavelength laser light to the fifth mirror 145. The fourth mirror 144 is configured to reflect the third wavelength laser light and the second wavelength laser light, and the fifth lens mirror 145 is configured to transmit the third wavelength laser light and the second wavelength laser light and reflect the first wavelength laser light.

In some embodiments, the fourth mirror 144 of the fourth light combining component 140 is a reflector for reflecting all colors of light, or a dichroic filter for reflecting the third wavelength laser light and the second wavelength laser light and transmitting other colors of laser light; and the fifth mirror 145 is a dichroic filter for reflecting the first wavelength laser light and transmitting other colors of laser light.

When the polarization polarity of the second wavelength laser light and the third wavelength laser light emitted from the first laser array 101 is opposite to that of the first wavelength laser light, for example, the second wavelength laser light and the third wavelength laser light is S-polarized light, and the first wavelength laser light is P-polarized light, as shown in FIG. 15, FIG. 16, FIG. 22, and FIG. 32, the light source 100 further includes a first polarization conversion component 105. The first polarization conversion component 105 is configured to convert the third wavelength laser light and the second wavelength laser light emitted from the first laser array 101 from the S-polarized light into the P-polarized light. In this way, the polarization directions of the second wavelength laser light and the third wavelength laser light incident into the fly-eye lens 104 are both the same as the polarization direction of the first wavelength laser light. Thus, the laser light with the same polarization direction is used to form the projection picture, which can prevent color blocks from occurring in the formed projection picture due to different transmissive and reflective efficiencies of the optical lens for different polarized light. Exemplarily, the first polarization conversion component 105 is a half-wave plate.

Figure 32:
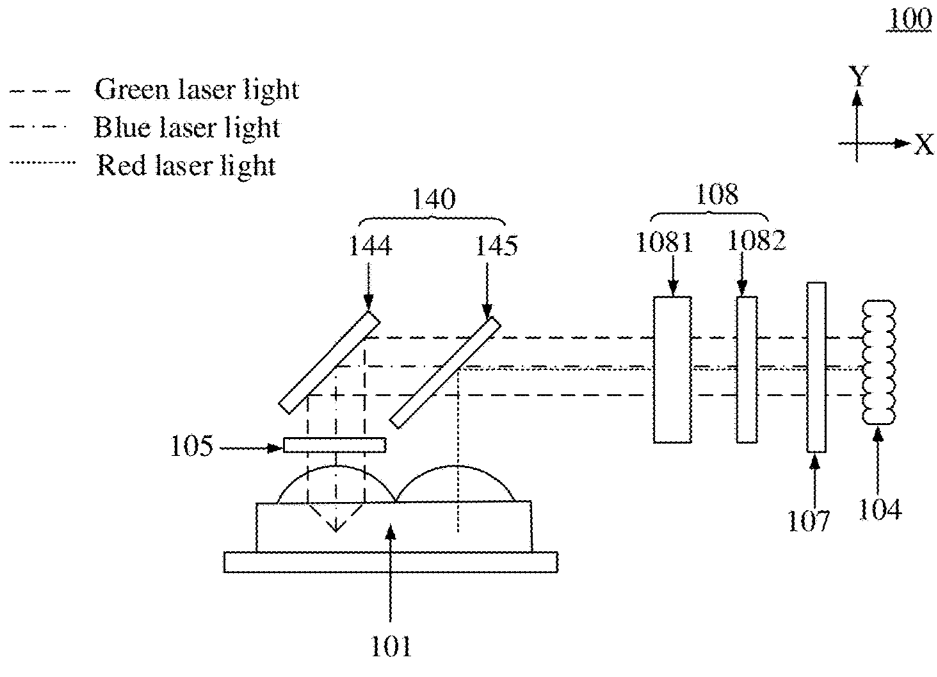
FIG. 32 is a structural diagram of yet another light source according to some embodiments.

In some embodiments, as shown in FIG. 15, the first polarization conversion component 105 is disposed between the first laser array 101 and the first reflective part 1401 of the fourth light combining component 140. Alternatively, as shown in FIG. 16, the first polarization conversion component 105 is disposed between the first laser array 101 and the first mirror 141 and the second mirror 142 of the fourth light combining component 140. Alternatively, as shown in FIG. 32, the first polarization conversion component 105 is disposed between the first laser array 101 and the fourth mirror 144 of the fourth light combining component 140. Alternatively, as shown in FIG. 22, the first polarization conversion component 105 is disposed between the first laser array 101 and the fourth mirror 124 and the fifth mirror 125 of the second light combining component 120.

Figure 11:
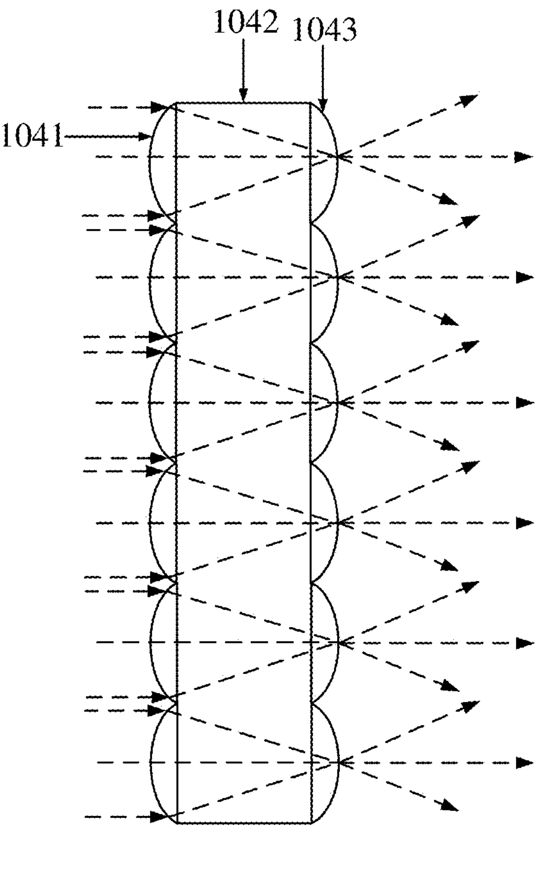
FIG. 11 is an optical path diagram of a fly-eye lens according to some embodiments.

Referring to FIG. 11, the fly-eye lens 104 includes a glass substrate 1042, a plurality of first microlenses 1041 arranged in an array on the light-incident surface of the glass substrate 1042, and a plurality of second microlenses 1043 arranged in an array on the light-output surface of the glass substrate 1402. The plurality of first microlenses 1041 correspond to the plurality of second microlenses 1043, and the shape and size of each of first microlenses 1041 is the same as the shape and size of the corresponding second microlens 1043. Exemplarily, the plurality of first microlenses 1041 and the plurality of second microlenses 1043 are all spherical convex lenses or aspherical convex lenses, and the plurality of first microlenses 1041 are in one-to-one correspondence with the plurality of second microlenses 1043.

In this way, the plurality of first microlenses 1041 can segment the light spots of the laser beams emitted from each laser, and then the plurality of second microlenses 1043 accumulate the segmented light spots, thereby homogenizing the laser beams emitted from the various lasers, and homogenizing the laser beams emitted from the first laser array 101 and the second laser array 102.

In the light source 100 provided by some embodiments of the present disclosure, the fly-eye lens 104 is adopted to homogenize the laser beams. Since the fly-eye lens 104 includes a glass substrate 1042, a plurality of first microlenses 1041 disposed on the light-incident surface of the glass substrate 1042 and a plurality of second microlenses 1043 disposed on the light-output surface of the glass substrate 1042, the fly-eye lens 104 usually has a small size, which effectively reduces the size of the light source 100. In addition, the light source 100 does not need to be provided with a converging lens group and a converging lens, which further reduces the size of the light source 100. After the light source 100 is integrated into the laser projection apparatus 10, the size of the laser projection apparatus 10 can be effectively reduced.

Figure 10:
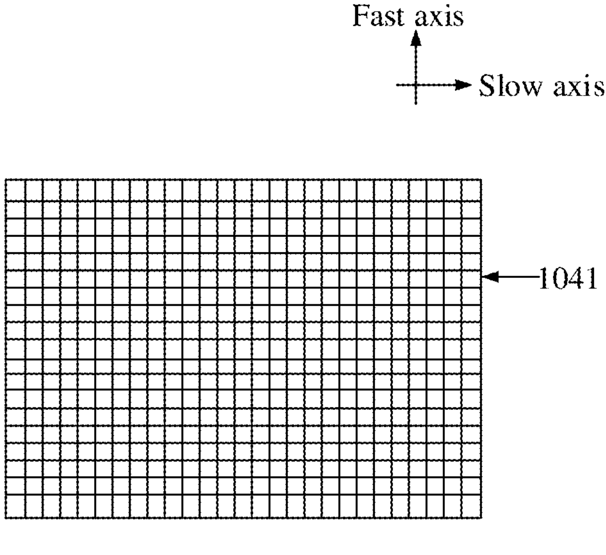
FIG. 10 is a front view of a fly-eye lens shown in FIG. 9.

As shown in FIG. 10, in a target direction, that is, a fast axis direction or a slow axis direction of the laser light, the size of the first microlens 1041 of the fly-eye lens 104 is determined based on the size of the light spot formed by the laser on the light-incident surface of the fly-eye lens 104 and the size of the light valve 240. In this way, the first microlens 1041 determined based on the size of the light spot of the laser beam emitted from the laser and the size of the light valve 240 have a better homogenization effect on the laser beams emitted from the lasers.

It should be noted that the first laser array 101 and the second laser array 102 are both semiconductor lasers, and the laser light emitted from the semiconductor laser has a fast axis and a slow axis. The divergence angle of the laser light in the fast axis direction is about ±30 degrees, and the divergence angle of the laser light in the slow axis direction is about ±10 degrees. After the laser beams emitted from the first laser array 101 and the second laser array 102 are collimated, the size of the light spot in the fast axis direction is larger than that in the slow axis direction, and the shape of the light spot is rectangular or elliptical. The direction of the long side of the light spot is the fast axis direction, and the direction of the short side of the light spot is the slow axis direction.

In some embodiments, the size d of the first microlens 1041 in the target direction satisfies the following formula (1):

$$d = \frac{D \times \operatorname{Sin}\theta}{T} \times k; \tag{1}$$

wherein D represents the size of the light valve 240 in the target direction; θ represents an imaging angle of the lens head 300; T represents the size of the light spot formed by the laser on the light-incident surface of the fly-eye lens 104 in the target direction; and k represents a proportionality coefficient greater than 0.

It should be noted that the size of the light valve 240 in the target direction is determined once the model of the light valve 240 is determined. Therefore, the parameter D in the above formula is a fixed value. After the model of the lens head 300 in the laser projection apparatus 10 is determined, the imaging angle of the lens head 300 is a fixed value. For example, the imaging angle is 120°, 150°, or the like. Therefore, the parameter θ in the above formula is a fixed value. After the models of the light-emitting chips of the first laser array 101 and the light-emitting chips of the second laser array 102 are determined, the size of the light spot formed by each laser in the first laser array 101 and the second laser array 102 on the light-incident surface of the fly-eye lens 104 in the target direction is a fixed value.

Therefore, after the model of the light valve 240, the model of the lens head 300 in the laser projection apparatus 10, and the models of the light-emitting chips of the first laser array 101 and the models of the light-emitting chips of the second laser array 102 are determined, the sizes in the fast axis direction and the slow axis direction of the first microlens 1041 disposed on the light-incident surface of the fly-eye lens 104 can be calculated according to the above calculation formula (1).

Figure 12:
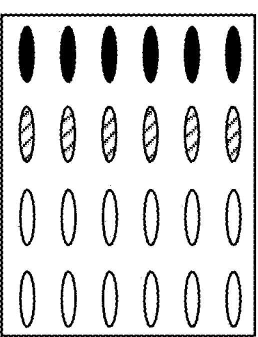
FIG. 12 is a schematic diagram of light spots formed by a laser array shown in FIG. 9.

Referring to FIG. 12, the light spot formed by the laser light emitted from each laser on the light-incident surface of the fly-eye lens 104 is overlapped with the area where the at least one first microlens 1041 is located. In this case, the laser light emitted from each laser can be homogenized by the fly-eye lens 104.

In some embodiments, the light spot formed by the laser light emitted from each laser on the light-incident surface of the fly-eye lens 104 is overlapped with the area where the at least two first microlenses 1041 are located. In this case, the fly-eye lens 104 achieves a better homogenization effect on the laser beams emitted from each laser.

In some embodiments, the light spot formed by the laser light emitted from each laser on the light-incident surface of the fly-eye lens 104 is overlapped with the area where at least four first microlenses 1041 are located on the light-incident surface of the fly-eye lens 104, and the at least four first microlenses 1041 are at least arranged in two rows and two columns. Exemplarily, when the light spot formed by the laser light emitted from each laser on the light-incident surface of the fly-eye lens 104 is overlapped with the area where four first microlenses 1041 are located, the four first microlenses 1041 are arranged in two rows and two columns. In this way, the homogenization effect on the laser beams emitted from each laser by the fly-eye lens 104 can be further improved.

In some embodiments, the first microlenses 1041 in the fly-eye lens 104 have the same size. For example, the size of the first microlens 1041 in the fast axis direction and the size of the first microlens 1041 in the slow axis direction both range from 0.1 mm to 1 mm.

Figure 17:
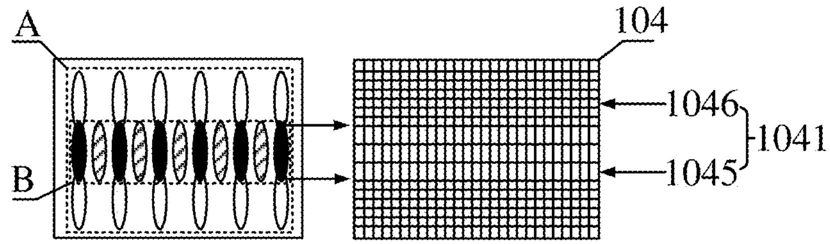
FIG. 17 is an effect diagram of a light spot of combined light from the laser array shown in FIG. 16 incident on a fly-eye lens.

In order to ensure the imaging quality of the projection image of the laser projection apparatus the number of the first lasers is generally greater than the number of the second lasers and the number of the third lasers. For example, the first laser array 101 and the second laser array 102 each include two rows of first lasers, one row of second lasers, and one row of third lasers. After the three colors of laser beams are combined by the light combining assembly 103, the size of the light spot formed by the first wavelength laser light is bigger, and the sizes of the light spot formed by the second wavelength laser light and the third wavelength laser light are smaller. Exemplarily, as shown in FIG. 17, the areas of the light spots formed by the second wavelength laser light and the third wavelength laser light on the fly-eye lens 104 are both B, and the area of the light spot formed by the first wavelength laser light on the fly-eye lens 104 is A, that is, the area of the light spots formed by the second wavelength laser light and the third wavelength laser light on the fly-eye lens 104 are both smaller than the area of the light spot formed by the first wavelength laser light on the fly-eye lens 104.

Since the etendue of the laser light is a product of the area of the light spot of the laser beam and the divergence angle of the laser beam, the etendue of the first wavelength laser light is greater than the etendue of the second wavelength laser light and the etendue of the third wavelength laser light, resulting in a color demarcation phenomenon of the light spots after the three colors of laser beams are combined. For example, the edge region of the light spot is redder than the middle region. When the light spot after light combination is incident on the lens head 300 in the laser projection apparatus 10 and forms a projection image, the color uniformity of the projection image is poor, thereby resulting in a poor display effect of the laser projection apparatus 10.

Therefore, in some embodiments of the present disclosure, the plurality of first microlenses 1041 includes a plurality of third microlenses 1045 and a plurality of fourth microlenses 1046. The plurality of third microlenses 1045 are configured to receive the second wavelength laser light, the third wavelength laser light, and part of the first wavelength laser light, and the plurality of fourth microlenses 1046 are configured to receive the other part of the first wavelength laser light. The size of the third microlens 1045 in the fast axis direction is greater than the size of the fourth microlens 1046 in the fast axis direction.

Figure 18:
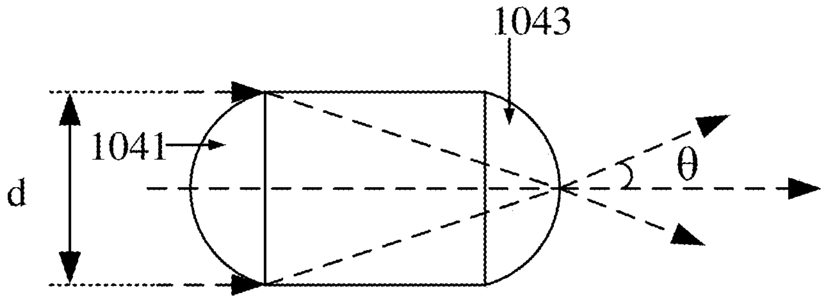
FIG. 18 is another optical path diagram of a fly-eye lens according to some embodiments.

Referring to FIG. 18, FIG. 18 is illustrated by taking an example in which only one first microlens 1041 is disposed on the light-incident surface of the fly-eye lens 104 and one second microlens 1043 is correspondingly disposed on the light-output surface of the fly-eye lens 104. The first microlens 1041 disposed on the light-incident surface of the fly-eye lens 104 can converge light to a center point of the second microlens 1043 correspondingly disposed on the light-output surface, such that light emitted from the second microlens 1043 can be emitted out at a certain divergence angle θ, wherein the certain divergence angle θ is greater than 0. According to FIG. 18, the larger the size d of the first microlens 1041 and the second microlens 1043 in the fast axis direction, the larger the divergence angle θ at which the light is emitted from the second microlens 1043.

In the plurality of first microlenses 1041 of the fly-eye lens 104, the size of the plurality of third microlenses 1045 for receiving the second wavelength laser light and the third wavelength laser light in the fast axis direction is greater than the size of the plurality of fourth microlenses 1046 for receiving the first wavelength laser light in the fast axis direction. Therefore, after the second wavelength laser light and the third wavelength laser light is guided to the plurality of third microlenses 1045 of the fly-eye lens 104, the divergence angles of the second wavelength laser light and the third wavelength laser light increase, which can increase the etendue of the second wavelength laser light and the third wavelength laser light. As such, the etendue of the second wavelength laser light and the third wavelength laser light is approximately the same as the etendue of the first wavelength laser light, which can avoid the color demarcation phenomenon of the light spots after the three colors of laser beams are combined. When the light spots after light combination are incident on the lens head 300 in the laser projection apparatus 10 and form a projection image, it can be ensured that the projection image has good color uniformity, and thus the laser projection apparatus 10 has a better display effect.

Figure 19:
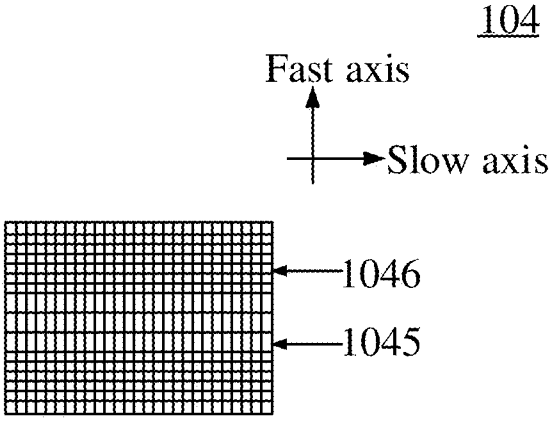
FIG. 19 is a front view of the fly-eye lens shown in FIG. 16.
Figure 21:
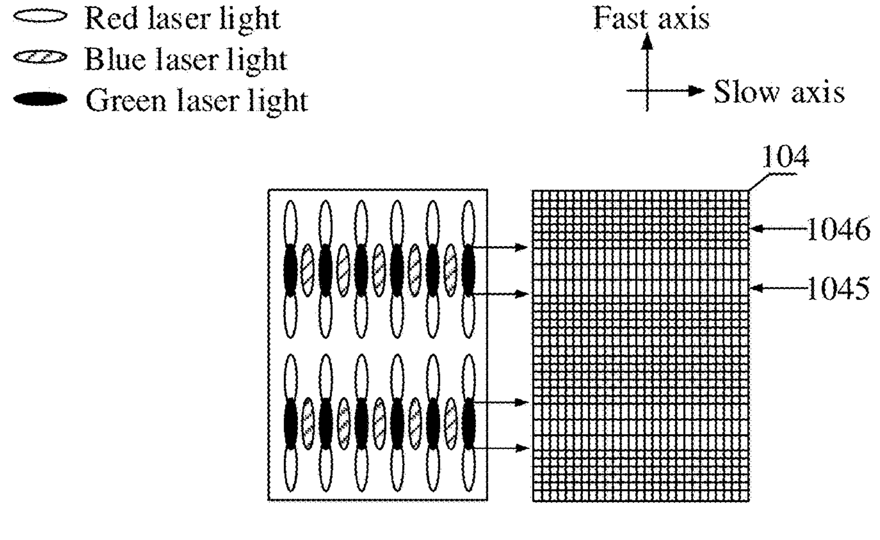
FIG. 21 is an effect diagram of a light spot of combined light from the laser array shown in FIG. 20 incident on a fly-eye lens.

In some embodiments, referring to FIG. 19, FIG. 21, and FIG. 23, in the fly-eye lens 104, the size of the third microlens 1045 in the fast axis direction of the laser light is greater than the size of the fourth microlens 1046 in the fast axis direction, and the size of the third microlens 1045 in the slow axis direction of the laser light may be equal to the size of the fourth microlens 1046 in the slow axis direction.

In some embodiments, a first ratio of the area of the light spot formed by the first wavelength laser light on the fly-eye lens 104 to the area of the light spots formed by the second wavelength laser light and the third wavelength laser light on the fly-eye lens 104 is directly proportional to a second ratio of the size of the third microlens 1045 in the fast axis direction to the size of the fourth microlens 1046 in the fast axis direction.

In some embodiments, a ratio of the first ratio to the second ratio ranges from 0.75 to 1.5. For example, in the case that the first ratio of the area of the light spot formed by the first wavelength laser light on the fly-eye lens 104 to the area of the light spots formed by the second wavelength laser light and the third wavelength laser light on the fly-eye lens 104 is 2, if the ratio of the first ratio to the second ratio is 0.75, the second ratio of the size of the third microlens 1045 in the fast axis direction to the size of the fourth microlens 1046 in the fast axis direction is 1.5; and if the ratio of the first ratio to the second ratio is 1, the second ratio of the size of the third microlens 1045 in the fast axis direction to the size of the fourth microlens 1046 in the fast axis direction is 2.

It should be noted that the speckle effect is easily generated when the laser projection apparatus performs projection display. The speckle effect refers to that two laser beams emitted from coherent light sources are scattered after irradiating a rough object (for example, a screen of the laser projection apparatus 10) and interfere with each other in the space, and finally granular bright and dark spots appear on the screen. The speckle effect makes the display effect of the projection image poor. In addition, the unfocused bright and dark spots are in a flickering state when viewed by human eyes, which generates vertigo when viewed for a long time. Thus, the viewing experience of users is poor.

In the light source 100 provided in some embodiments of the present disclosure, the size of the plurality of third microlenses 1045 for receiving the second wavelength laser beams and the third wavelength laser beams in the fly-eye lens 104 in the fast axis direction is greater than the size of the plurality of fourth microlenses 1046 for receiving the first wavelength laser beams in the fast axis direction. In this way, the etendue of the second wavelength laser beams and the etendue of the third wavelength laser beams are increased. Therefore, the laser beams become more uniform under the effect of the fly-eye lens 104, such that the interference generated by the laser beams for projection is weak, and the speckle effect during projection display of the laser projection apparatus 10 can be weakened. Thus, the projection image is prevented from becoming blurred, the display effect of the projection image is improved, and the vertigo from human eyes is avoided.

Figure 26:
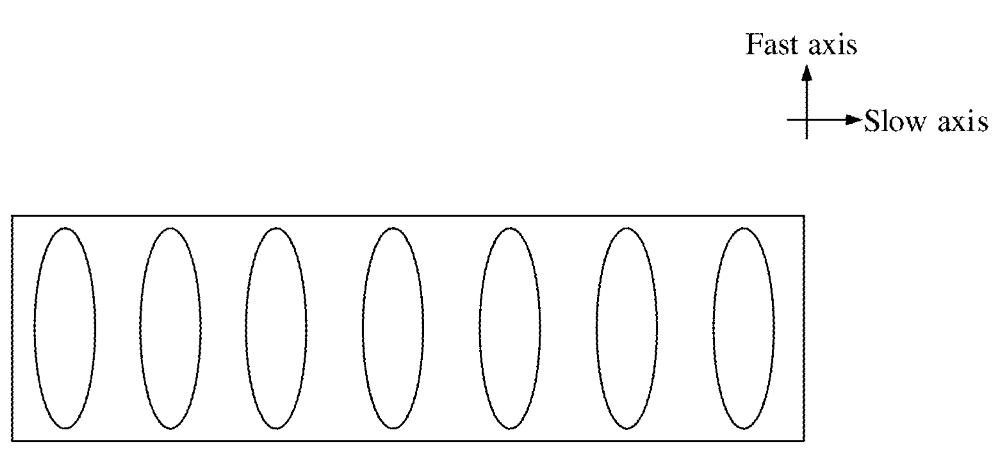
FIG. 26 is a schematic diagram of a light spot of a laser beam emitted from the laser array shown in FIG. 24 after being combined.

Referring to FIG. 26, the plurality of lasers in the first laser array 101 emit laser beams to the light combining assembly 103, the shape of the light spot formed after the laser beams are combined by the light combining assembly 103 is generally rectangular, and the size of the light spot in the slow axis direction of the laser light (that is, the size of the long side of the rectangular light spot) is greater than the size of the light spot in the fast axis direction of the laser light (that is, the size of the short side of the rectangular light spot). For example, the ratio of the size of the long side of the light spot formed after the laser beams are combined to the size of the short side is 3:1.

According to the calculation formula of the etendue in the optical principle, it can be known that the calculation formula (2) of the etendue of the laser light of the laser projection apparatus 10 is:

$$\pi \times S \times (\mathrm{Sin}\ Q)^2 \quad (2);$$

wherein S represents an area of an illuminated surface of the light valve, the illuminated surface of the light valve is generally rectangular, and thus the area S of the illuminated surface of the light valve may be represented by the product of a size H1 of a long side and a size H2 of a short side of the illuminated surface; Q represents the exiting angle of the laser beam after passing through the lens head, and after the model of the lens head is determined, the value of F# of the lens head (a ratio of a focal length to an aperture of the lens head) is determined, and thus the exiting angle Q of the laser beam after passing through the lens head may be determined according to the F# of the lens head, wherein the relationship between F# and Q is:

$$Q = \frac{1}{2F\#}.$$

That is, the calculation formula (3) of the etendue of the laser light of the laser projection apparatus is:

$$\pi \times H1 \times H2 \times \text{Sin}^2\left(\frac{1}{2F\#}\right). \quad (3)$$

According to the above formula, it can be known that after the model of the light valve and the model of the lens head are determined, the etendue of the laser light of the laser projection apparatus is determined, and the Lagrangian of the corresponding long side and short side is determined. However, since the size of the long side of the light spot formed after the laser beams emitted from the first laser array 101 are converged by the light combining assembly 103 is greater than the size of the short side, the exiting angle of the laser beam emitted to the fly-eye lens 104 in the long side direction of the light spot is greater than the exiting angle in the short side direction of the light spot. Therefore, at least one of the long side and the short side of the light spot does not satisfy the Lagrange invariant.

For example, the formula (4) of the Lagrange invariant is:

$$n \times \text{Sin}\ Q \times Y = n' \times \text{Sin}\ Q' \times Y' \quad (4);$$

wherein n represents a refractive index of a transmission medium after the laser beam is emitted from the lens head; Q represents the exiting angle of the laser beam when being emitted from the lens head; Y represents an image height of an imaging object; n' represents a refractive index of a transmission medium after the laser beam is emitted from the fly-eye lens; and Q' represents an incident angle of the laser beam when being emitted to the lens head. After the laser beam in the laser light source is emitted from the fly-eye lens, the laser beam is reflected for multiple times and then is emitted to the lens head, so Q' may be represented by the exiting angle of the laser beam when being emitted out from the fly-eye lens. Y' represents an object height of the imaging object. In the laser projection apparatus, n and n' may both be the refractive index of air, so n=n'.

The length-width ratio of the laser beam after passing through the lens head is equal to the length-width ratio of the illuminated surface of the light valve. Therefore, according to the formula of the Lagrange invariant, it can be known that the Lagrange expression of the long side of the light spot after being emitted out from the lens head may be:

$$n \times \text{Sin}\left(\frac{1}{2F\#}\right) \times H1,$$

and the Lagrange expression of the long side of the light spot when emitting to the lens head may be: n'×Sin(Q1')×d1. The Lagrange expression of the short side of the light spot after being emitted out from the lens head may be:

$$n \times \text{Sin}\left(\frac{1}{2F\#}\right) \times H2,$$

and the Lagrange expression of the short side of the light spot when emitting to the lens head may be: n'×Sin(Q2')×d2. Here, d1 represents the size of the long side of the light spot formed after the laser beams are combined, and d2 represents the size of the short side of the light spot formed after the laser beams are combined; Q1' represents the exiting angle of the laser beam emitted to the fly-eye lens in the long side direction of the light spot, and Q2' represents the exiting angle of the laser beam emitted to the fly-eye lens in the short side direction of the light spot.

In order to ensure a high light emitting efficiency of the laser projection apparatus, generally, the long side of the light spot needs to satisfy the Lagrange invariant. That is, it should be ensured that $$k \times \text{Sin}\left(\frac{1}{2F\#}\right) \times H1 = \text{Sin}(Q1') \times d1,$$

wherein k is a constant, which is equal to n/n'.

Q1' and Q2' in the above expression satisfy the following relation:

$$\frac{\frac{1}{2}D1}{F} = \tan Q1'; \quad (5)$$

$$\frac{\frac{1}{2}D2}{F} = \tan Q2'; \quad (6)$$

wherein D represents the size of the long side of the first microlens in the fly-eye lens, D2 represents the size of the short side of the first microlens in the fly-eye lens, and F represents the focal length of the first microlens in the fly-eye lens. In the laser light source, the light valve needs to correspond to the first microlens in the fly-eye lens. That is, the length-width ratio of the first microlens is approximately equal to the length-width ratio of the illuminated surface of the light valve. Therefore, according to the above formula (5) and formula (6), it can be known that the ratio of Q1' to Q2' may be approximately equal to H1:H2.

As can be seen from the above, because the size of the long side of the light spot formed after the laser beams are combined is greater than the size of the short side, when $$k \times \text{Sin}\left(\frac{1}{2F\#}\right) \times H1 = \text{Sin}(Q1') \times d1,\ k \times \text{Sin}\left(\frac{1}{2F\#}\right) \times H2 > \text{Sin}(Q2') \times d2.$$

Therefore, the amount of loss of the etendue of the laser beam in the short side direction of the light spot is relatively large. As a result, the light valve has a low efficiency of transmitting the laser beams emitted from the laser array.

Figure 27:
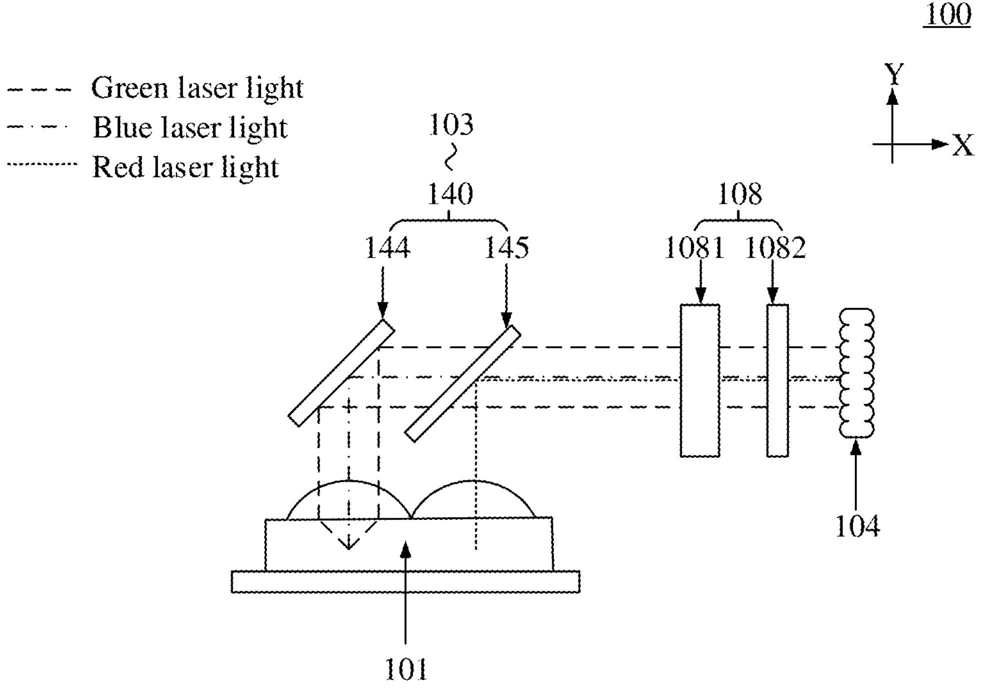
FIG. 27 is a structural diagram of yet another light source according to some embodiments.
Figure 28:
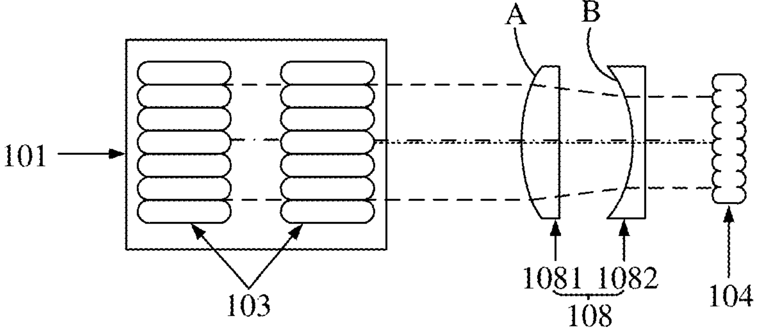
FIG. 28 is a top view of the light source shown in FIG. 27.
Figure 29:
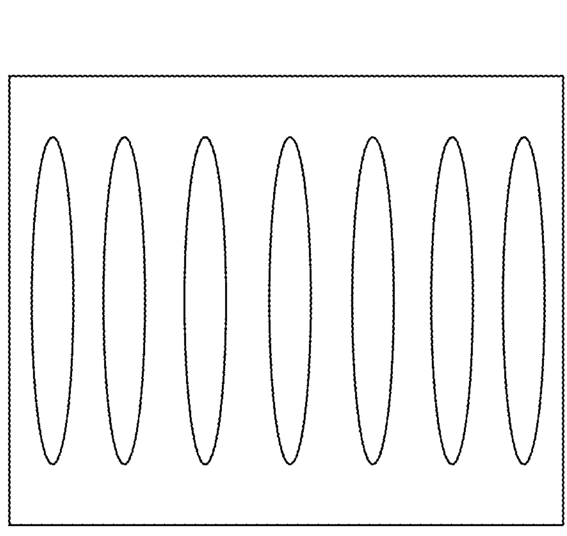
FIG. 29 is an effect diagram of shaping a laser beam by a shaping component according to some embodiments.

Thus, referring to FIG. 27, FIG. 28, and FIG. 29, the light source 100 further includes a shaping component 108, and the shaping component 108 is disposed between the light combining assembly 103 and the fly-eye lens 104. The laser beams emitted from the light combining assembly 103 are emitted to the shaping component 108 along the X-axis direction in FIG. 27, and are shaped by the shaping component 108 and then are emitted to the fly-eye lens 104. The fly-eye lens 104 homogenizes the incident laser beams.

The shaping component 108 is configured to shape the combined laser beams, such that the size of the light spot of the laser beam after being shaped in the slow axis direction of the laser light (that is, the size of the long side of the rectangular light spot) is smaller than the size of the light spot of the laser beam before being shaped in the slow axis direction of the laser light.

In the light source 100 provided in some embodiments of the present disclosure, the shaping component 108 shapes the laser beams combined by the light combining assembly 103, such that the size of the light spot of the laser beam after being shaped in the slow axis direction of the laser light (that is, the size of the long side of the rectangular light spot) is small. Thus, the difference between the size of the light spot of the laser beam after being shaped in the slow axis direction of the laser light and the size of the light spot of the laser beam after being shaped in the fast axis direction of the laser light (that is, the size of the short side of the rectangular light spot) is small. In this way, the amount of loss of the etendue of the laser beam in the short side direction of the light spot can be effectively reduced, thereby improving the transmission efficiency of the light valve in the optical machine 200 on the laser beams emitted from the light source 100.

It should be noted that the speckle effect is easily generated when the laser projection apparatus 10 performs projection display. The speckle effect refers to that two laser beams emitted from coherent light sources are scattered after irradiating a rough object (for example, a screen of the laser projection apparatus 10) and interfere with each other in the space, and finally granular bright and dark spots appear on the screen. The speckle effect makes the display effect of the projection image poor. In addition, the unfocused bright and dark spots are in a flickering state when viewed by human eyes, which generates vertigo when viewed for a long time. Thus, the viewing experience of users is poor.

In the light source 100 provided in some embodiments of the present disclosure, the shaping component 108 shapes the light beams combined by the light combining assembly 103, such that the size of the light spot of the laser beam after being shaped in the slow axis direction of the laser light is small. Thus, the difference between the size of the light spot of the laser beam shaped by the shaping component 108 in the slow axis direction of the laser light and the size of the light spot of the laser beam shaped by the shaping component 108 in the fast axis direction of the laser light is small. In this way, the amount of loss of the etendue of the laser beam in the short side direction of the light spot can be effectively reduced, and the interference generated by the laser beams for projection is weak, which can weaken the speckle effect during projection display of the laser projection apparatus 10. Thus, the projection image is prevented from becoming blurred, the display effect of the projection image is improved, and the vertigo from human eyes is avoided.

In some embodiments, the shaping component 108 in the light source 100 includes a first cylindrical arc surface A and a second cylindrical arc surface B. The first cylindrical arc surface A is more proximal to the light combining assembly 103 than the second cylindrical arc surface B is.

The shaping component 108 converges the combined laser beams in the slow axis direction of the laser light through the first cylindrical arc surface A and the shaping component 108 collimates the converged laser beams through the second cylindrical arc surface B, thereby obtaining the laser beams shaped by the shaping component 108.

In some embodiments, referring to FIG. 27 and FIG. 28, the shaping component 108 in the light source 100 includes two cylindrical lenses, which are a first cylindrical lens 1081 and a second cylindrical lens 1082. The first cylindrical lens 1081 and the second cylindrical lens 1082 are arranged along the X-axis direction in FIG. 27. The first cylindrical lens 1081 is more proximal to the light combining assembly 103 than the second cylindrical lens 1082 is. The first cylindrical lens 1081 includes a first cylindrical arc surface A, and the second cylindrical lens 1082 includes a second cylindrical arc surface B.

Referring to FIG. 28, the light-incident surface of the first cylindrical lens 1081, i.e., the first cylindrical arc surface A is a cylindrical convex surface, and the light-output surface of the first cylindrical lens 1081 is a plane; and the light-incident surface of the second cylindrical lens 1082, i.e., the second cylindrical arc surface B is a cylindrical concave surface, and the light-output surface of the second cylindrical lens 1082 is a plane. In this way, when the laser beams pass through the first cylindrical lens 1081, the first cylindrical lens 1081 can converge the laser beams in the slow axis direction of the laser light, which makes the size of the light spot in the slow axis direction of the laser light after the laser beams are combined same as the size of the light spot in the fast axis direction of the laser light after the laser beams are combined. The second cylindrical lens 1082 collimates the laser beams emitted from the first cylindrical lens 1081 and then guide the laser beams to the fly-eye lens 104.

Figure 31:
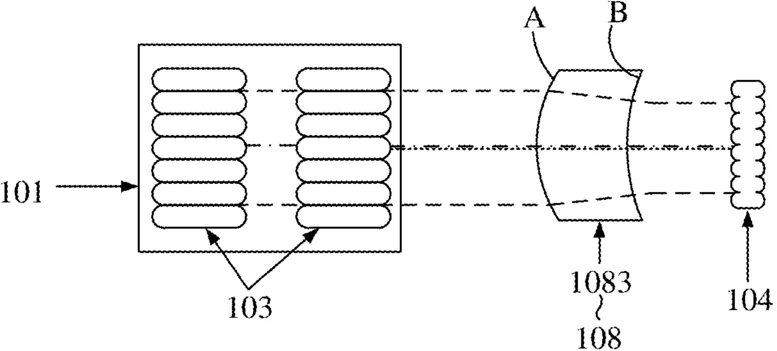
FIG. 31 is a top view of the light source shown in FIG. 30.

In some other embodiments, the shaping component 108 in the light source 100 includes one cylindrical lens. Referring to FIG. 30 and FIG. 31, the shaping component in the light source 100 includes a third cylindrical lens 1083. The third cylindrical lens 1083 includes a first cylindrical arc surface A and a second cylindrical arc surface B. The surface of the third cylindrical lens 1083 proximal to the light combining assembly 103 (that is, the light-incident surface of the third cylindrical lens 1083) is the first cylindrical arc surface A, and the surface of the third cylindrical lens 1083 distal from the light combining assembly 103 (that is, the light-output surface of the third cylindrical lens 1083) is the second cylindrical arc surface B.

Referring to FIG. 31, the light-incident surface of the third cylindrical lens 1083, i.e., the first cylindrical arc surface A, is a cylindrical convex surface; and the light-output surface of the third cylindrical lens 1083, i.e., the second cylindrical arc surface B, is a cylindrical concave surface. In this way, when the laser beams pass through the cylindrical convex surface of the third cylindrical lens 1083, the third cylindrical lens 1083 converges the laser beams in the slow axis direction of the laser light, which makes the size of the light spot in the slow axis direction after the laser beams are combined same as the size of the light spot in the fast axis direction. When the laser beams pass through the cylindrical concave surface of the third cylindrical lens 1083, the third cylindrical lens 1083 collimates the laser beams and then guide the laser beams to the fly-eye lens 104.

In some embodiments, the height direction of the cylindrical lens in the shaping component 108 is parallel to the fast axis direction of the laser light, such that the shaping component 108 can shape the laser beams combined by the light combining assembly 103 in the slow axis direction of the laser light, and the shaping component 108 does not shape the laser beams combined by the light combining assembly 103 in the fast axis direction of the laser light. Therefore, the difference between the size of the light spot of the laser beam shaped by the shaping component 108 in the slow axis direction of the laser light and the size of the light spot of the laser beam shaped by the shaping component 108 in the fast axis direction of the laser light is small.

In some embodiments, the shape of the light spot of the laser beam before being shaped by the shaping component 108 in the light source 100 and the shape of the light spot of the laser beam after being shaped by the shaping component 108 are both rectangular.

In some embodiments, a ratio of the size of the light spot of the laser beam shaped by the shaping component 108 in the light source 100 in the slow axis direction of the laser light to the size of the light spot of the laser beam shaped by the shaping component 108 in the fast axis direction of the laser light ranges from 0.6 to 2.

In some embodiments, the size of the light spot of the laser beam shaped by the shaping component 108 in the slow axis direction of the laser light is equal to the size of the light spot of the laser beam shaped by the shaping component 108 in the fast axis direction of the laser light. That is, the ratio of the size of the light spot of the laser beam shaped by the shaping component 108 in the slow axis direction of the laser light to the size of the light spot of the laser beam shaped by the shaping component 108 in the fast axis direction of the laser light is 1. For example, when $$k \times \mathrm{Sin}\left(\frac{1}{2F\#}\right) \times H1 = \mathrm{Sin}(Q1') \times d1,$$

since d1:d2 equals to $$k \times \mathrm{Sin}\left(\frac{1}{2F\#}\right) \times H2 > \mathrm{Sin}(Q2') \times d2.$$

Therefore, the amount of loss of the etendue of the laser beams in the short side direction of the light spot can be further effectively reduced, and the transmission efficiency of the light valve on the laser beams emitted from the laser is further improved.

In some embodiments, referring to FIG. 16, the light source 100 further includes a diffuser 107. The diffuser 107 is disposed between the light combining assembly 103 and the fly-eye lens 104. The laser beams emitted from the light combining assembly 103 are guided to the diffuser 107 along the X-axis direction in FIG. 16, and the diffuser 107 homogenizes the incident laser beams and then emit the laser beams to the fly-eye lens 104.

Figure 14:
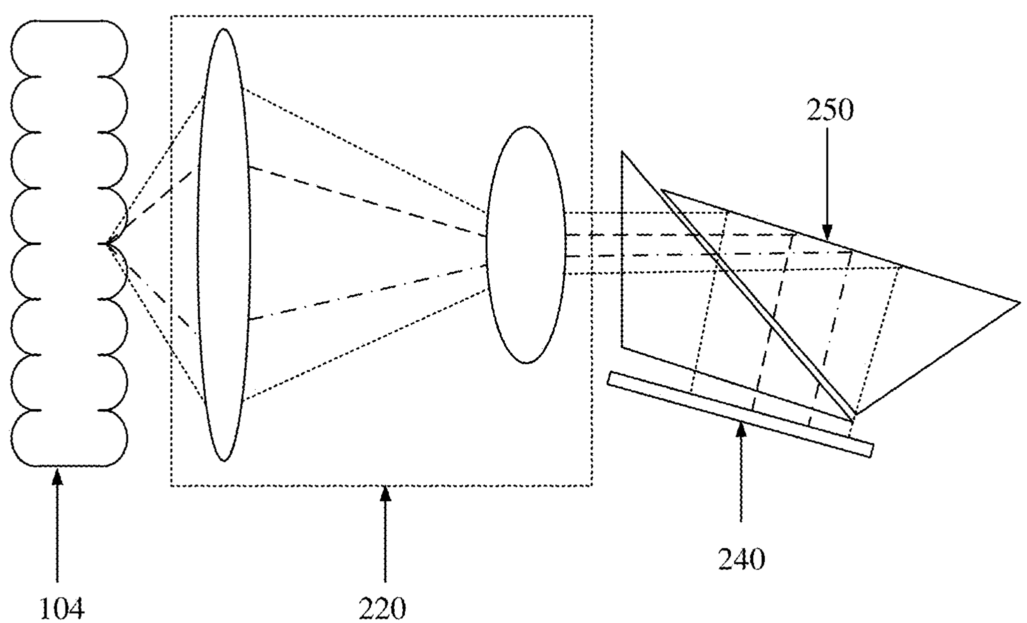
FIG. 14 is an effect diagram of a laser beam irradiating a surface of a light valve.
Figure 33:
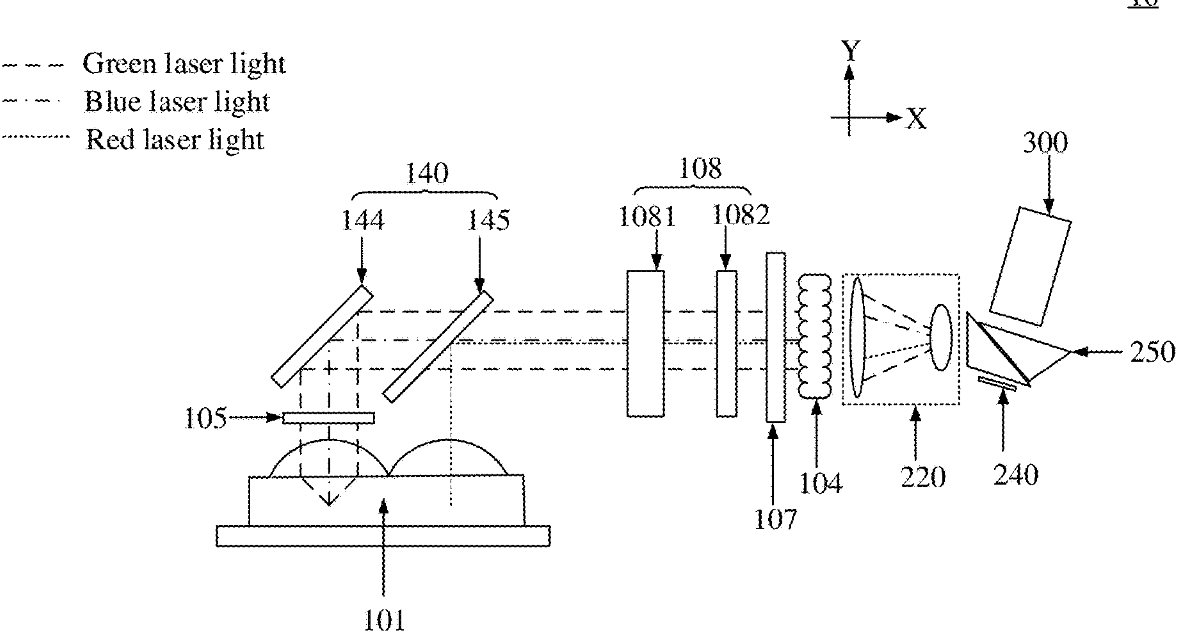
FIG. 33 is a structural diagram of another laser projection apparatus according to some embodiments.
Figure 34:
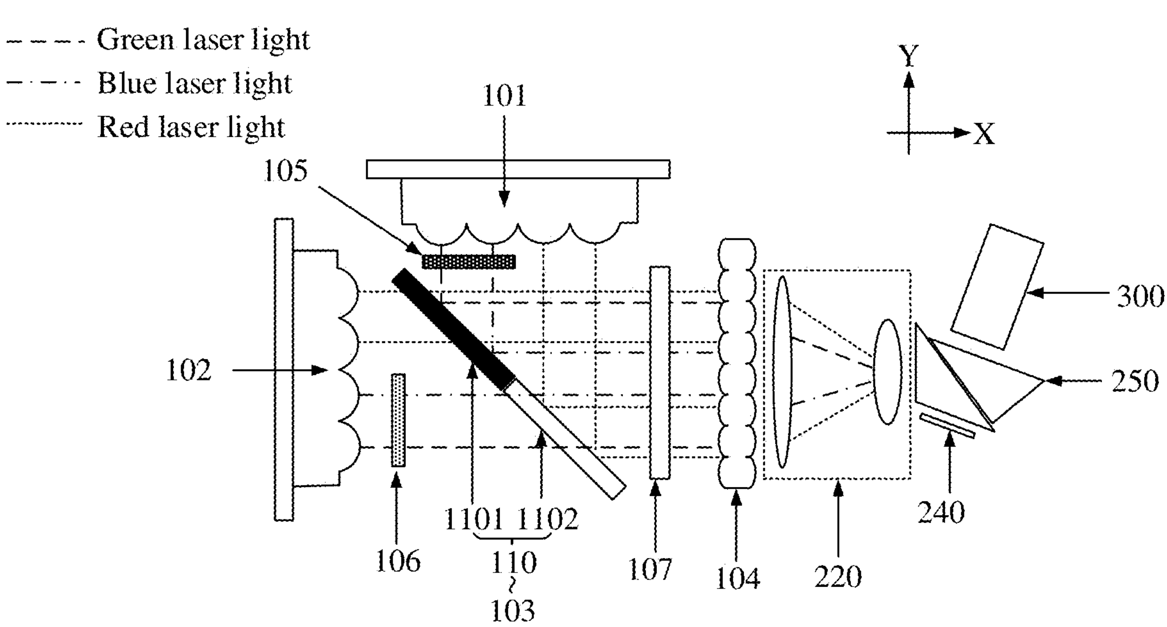
FIG. 34 is a structural diagram of yet another laser projection apparatus according to some embodiments.

In some embodiments, referring to FIG. 33 and FIG. 34, the lens assembly 220 in the optical machine 200 is disposed on the side of the fly-eye lens 104 distal from the light combining assembly 103, and the prism assembly 250 and the light valve 240 in the optical machine 200 are both disposed on the side of the lens assembly 220 distal from the fly-eye lens 104. The prism assembly 250 includes a total internal reflection (TIR) prism. The laser beams emitted from the laser array are incident to the light combining assembly 103, the light combining assembly 103 guides the laser beams to the fly-eye lens 104, the fly-eye lens 104 homogenizes the incident laser beams and then emits the laser beams to the lens assembly 220, the lens assembly 220 guides the laser beams emitted from the fly-eye lens 104 to the prism assembly 250, the prism assembly 250 guides the laser beams to the light valve 240, and the light valve 240 modulates the laser beams and then guides the laser beams to the lens head 300, and the lens head 300 projects the incident laser beams to form a projection image. In some embodiments, referring to FIG. 13 and FIG. 14, a center point of the light-output surface of the fly-eye lens 104 coincides with a focal point of the lens assembly 220. Exemplarily, the center point of the light-output surface of the fly-eye lens 104 coincides with a focal point of the lens assembly 220 proximal to the light combining assembly 103, which can ensure that the laser beams emitted from various points of the light-output surface of the fly-eye lens 104 are incident on the surface of the light valve 240 in parallel when the laser beams are guided to the light valve 240.

The above descriptions are merely specific embodiments of the present disclosure, but the protection scope of the present disclosure is not limited thereto. Any variations or replacements made by persons skilled in the art within the technical scope of the present disclosure shall fall within the protection scope of the present disclosure. Therefore, the protection scope of the present disclosure shall be determined by the protection scope of the claims.

What is claimed is:

1. A light source, comprising:

at least one laser array, a light combining assembly, and a fly-eye lens; wherein the at least one laser array is configured to emit at least two colors of laser light, wherein the at least two colors of laser light comprises a first wavelength laser light, a second wavelength laser light, and a third wavelength laser light, etendue of the first wavelength laser light being greater than etendue of the second wavelength laser light and etendue of the third wavelength laser light;

the light combining assembly is disposed on a light-output side of the at least one laser array and is configured to guide the laser light emitted from the at least one laser array to the fly-eye lens;

the fly-eye lens is disposed on a light-output side of the light combining assembly and is configured to homogenize the laser light emitted from the at least one laser array;

wherein the fly-eye lens comprises:

a substrate;

a plurality of first microlenses disposed on a light-incident surface of the substrate; and a plurality of second microlenses disposed on a light-output surface of the substrate, wherein each of the first microlenses is configured to converge light to a center point of the second microlens correspondingly disposed on the light-output side, such that light emitted from the second microlens is emitted out at a certain divergence angle θ, wherein the certain divergence angle θ is greater than 0;

wherein a size d of the first microlens in a target direction satisfies:

$$d = \frac{D \times \mathrm{Sin}\theta}{T} \times k;$$

wherein D represents a size of a light valve in the target direction; θ represents an imaging angle of a lens head, T represents a size of a light spot formed by a laser on a light-incident surface of the fly-eye lens in the target direction, k represents a proportionality coefficient greater than 0, and the target direction is a fast axis direction or a slow axis direction of laser light.

2. The light source according to claim 1, wherein each of the at least one laser array comprises a plurality of lasers, wherein a light spot formed by laser light emitted from each of the lasers on the fly-eye lens is overlapped with at least one of the first microlenses.

3. The light source according to claim 1, wherein an area of a light spot formed by the second wavelength laser light on the fly-eye lens and an area of a light spot formed by the third wavelength laser light on the fly-eye lens are smaller than an area of a light spot formed by the first wavelength laser light on the fly-eye lens; and the plurality of first microlenses comprise a plurality of third microlenses and a plurality of fourth microlenses; wherein the plurality of third microlenses are configured to receive the second wavelength laser light, the third wavelength laser light and part of the first wavelength laser light; and the plurality of fourth microlenses are configured to receive the other part of the first wavelength laser light;

wherein a size of each of the third microlenses in a fast axis direction of laser light is greater than a size of each of the fourth microlenses in the fast axis direction.

4. The light source according to claim 3, wherein a size of the third mircolens in a slow axis direction of laser light is equal to a size of the fourth microlens in the slow axis direction.

5. The light source according to claim 3, wherein a first ratio of the area of the light spot formed by the first wavelength laser light on the fly-eye lens to the area of the light spots formed by the second wavelength laser light and the third wavelength laser light on the fly-eye lens is directly proportional to a second ratio of the size of the third microlens in the fast axis direction to the size of the fourth microlens in the fast axis direction.

6. The light source according to claim 1, further comprising: a shaping component; wherein the shaping component is disposed between the light combining assembly and the fly-eye lens, and is configured to shape a laser beam from the light combining assembly, such that a size of a light spot of the laser beam after being shaped in a slow axis direction of laser light is smaller than a size of a light spot of the laser beam before being shaped in the slow axis direction, or, such that a difference between the size of the light spot of the laser beam after being shaped in the slow axis direction of laser light and a size of the light spot of the laser beam after being shaped in a fast axis direction of laser light is small.

7. The light source according to claim 1, wherein the at least one laser array comprises a first laser array and a second laser array, wherein a light-output direction of the first laser array is perpendicular to a light-output direction of the second laser array, the first laser array emits a first laser beam, and the second laser array emits a second laser beam; and the light combining assembly comprises a first light combining component, wherein the first light combining component is disposed at an intersection of the first laser beam and the second laser beam, and is configured to reflect the first laser beam and transmit the second laser beam.

8. The light source according to claim 7, wherein the first laser beam and the second laser beam each comprise a first wavelength laser light, a second wavelength laser light, and a third wavelength laser light; and the first light combining component comprises a first light combining element and a second light combining element; wherein the first light combining element is configured to reflect the second wavelength laser light and the third wavelength laser light in the first laser beam, and transmit the first wavelength laser light in the second laser beam; and the second light combining element is configured to reflect the first wavelength laser light in the first laser beam and transmit the second wavelength laser light and the third wavelength laser light in the second laser beam.

9. The light source according to claim 8, wherein the first light combining element and the second light combining element are two dichroic elements with different wavelength selection characteristics; or the first light combining element and the second light combining element are two polarizing elements with different polarization selection characteristics.

10. The light source according to claim 1, wherein the at least one laser array comprises a first laser array and a second laser array, wherein a light-output direction of the first laser array is parallel to a light-output direction of the second laser array, the first laser array emits a first laser beam, and the second laser array emits a second laser beam; and the light combining assembly comprises a second light combining component and a third light combining component, wherein the second light combining component is disposed on a light-output side of the first laser array and is configured to reflect the first laser beam to the fly-eye lens; and the third light combining component is disposed on a light-output side of the second laser array and is configured to reflect the second laser beam to the fly-eye lens;

wherein the first laser beam comprises one of the first wavelength laser light, the second wavelength laser light, and the third wavelength laser light, and the second laser beam comprises the first wavelength laser light, the second wavelength laser light, and the third wavelength laser light; or, the first laser beam comprises the first wavelength laser light, the second wavelength laser light, and the third wavelength laser light, and the second laser beam comprises one of the first wavelength laser light, the second wavelength laser light, and the third wavelength laser light; or, the first laser beam and the second laser beam each comprise the first wavelength laser light, the second wavelength laser light, and the third wavelength laser light.

11. The light source according to claim 10, wherein on a plane of a light-incident surface of the fly-eye lens, an orthographic projection of the second light combining component and an orthographic projection of the third light combining component are not overlapped with each other.

12. The light source according to claim 10, wherein in a case that the first laser beam and the second laser beam each comprise the first wavelength laser light, the second wavelength laser light, and the third wavelength laser light; and the second light combining component and the third light combining component each comprise a first mirror, a second mirror, and a third mirror; wherein the first mirror is configured to reflect the third wavelength laser light, the second mirror is configured to reflect the second wavelength laser light and transmit the third wavelength laser light, and the third mirror is configured to reflect the first wavelength laser light and transmit the third wavelength laser light and the second wavelength laser light.

13. The light source according to claim 12, wherein on a plane of a light-incident surface of the fly-eye lens, an orthographic projection of the first mirror, an orthographic projection of the second mirror, and an orthographic projection of the third mirror are at least partially overlapped with each other.

14. The light source according to claim 1, wherein the at least one laser array comprises a first laser array, wherein the first laser array emits a first laser beam; and the light combining assembly comprises a fourth light combining component, wherein the fourth light combining component is disposed on a light-output side of the first laser array and is configured to reflect the first laser beam to the fly-eye lens.

15. The light source according to claim 1, wherein a size of the first microlens in a fast axis direction of laser light and a size of the first microlens in a slow axis direction of laser light both range from 0.1 mm to 1 mm.

16. The light source according to claim 1, wherein a length-width ratio of the first microlens is equal to a length-width ratio of an illuminated surface of a light valve.

17. The light source according to claim 1, wherein the light source further comprises a polarization conversion component, wherein the polarization conversion component is provided in an optical path of the laser array, and is configured to perform a polarity change on a portion of a laser beam exiting from the laser array.

18. The light source according to claim 17, the polarization conversion component is half-wave plate, and the polarization conversion component is disposed between a light-output surface of the laser array and the light combining assembly.

19. A laser projection apparatus, comprising:

the light source as defined in claim 1, an optical machine, and a lens head; wherein the light source is configured to emit an illumination beam to the optical machine;

the optical machine comprises a light valve configured to modulate the illumination beam emitted from the light source to obtain a projection beam; and the lens head is configured to image the projection beam.

* * * * *